United States Patent [19]
Suzuki et al.

[11] Patent Number: 4,609,938
[45] Date of Patent: Sep. 2, 1986

[54] DIGITAL TV RECEIVER WITH DIGITAL VIDEO PROCESSING CIRCUIT

[75] Inventors: Susumu Suzuki, Kawasaki; Yukinori Kudo, Fujisawa, both of Japan

[73] Assignee: Tokyo Shibaura Denki Kabushiki Kaisha, Kawasaki, Japan

[21] Appl. No.: 517,443

[22] Filed: Jul. 26, 1983

[30] Foreign Application Priority Data

Jul. 30, 1982 [JP] Japan ............................. 57-132262
Dec. 28, 1982 [JP] Japan ............................. 57-233420

[51] Int. Cl.$^4$ .............................................. H04N 9/70
[52] U.S. Cl. .................................. 358/26; 358/21 R; 358/31
[58] Field of Search .................... 358/21 R, 26, 31

[56] References Cited

FOREIGN PATENT DOCUMENTS

| 0051075 | 5/1982 | European Pat. Off. |
|---|---|---|
| 54-0022126 | 2/1979 | Japan ........................... 358/26 |
| 55-83390 | 6/1980 | Japan . |
| 57-0017291 | 1/1982 | Japan ........................... 358/26 |
| 57-104395 | 6/1982 | Japan . |
| 2038138 | 7/1980 | United Kingdom . |

OTHER PUBLICATIONS

"What is the Impact of Digital TV?", Fischer, ITT Semiconductors, pp. 423–430, IEEE Trans of Consumer Electronics, vol. CE–28, No. 2, Aug. 1982.
Jacobsen, "Bildverbesserung durch prozessorgesteuerte Digitale Signalverarbeitung im PAL–Farbfernsehempfänger", Tagungsband, 9–Jahrestagung der FKTG, 21–24, Sep. 1981, Vortrag 23, pp. 424–457.

Primary Examiner—Michael A. Masinick
Attorney, Agent, or Firm—Cushman, Darby and Cushman

[57] ABSTRACT

A digital TV receiver includes an A/D converter circuit for converting an analog video signal to a digital video signal, a signal separator circuit for separating a digital chroma signal and a digital Y signal from the digital video signal, a color killer circuit for gating the digital chroma signal to generate a gated C signal when burst components are contained in the digital chroma signal, and a processor circuit for digitally composing RGB signals from the digital Y signal and the gated C signal. The RGB signals are used as tricolor signals for a color CRT.

32 Claims, 27 Drawing Figures

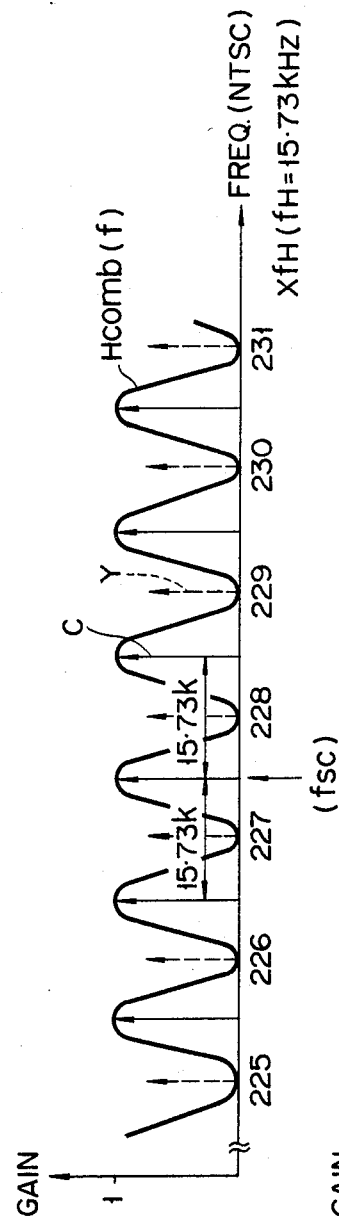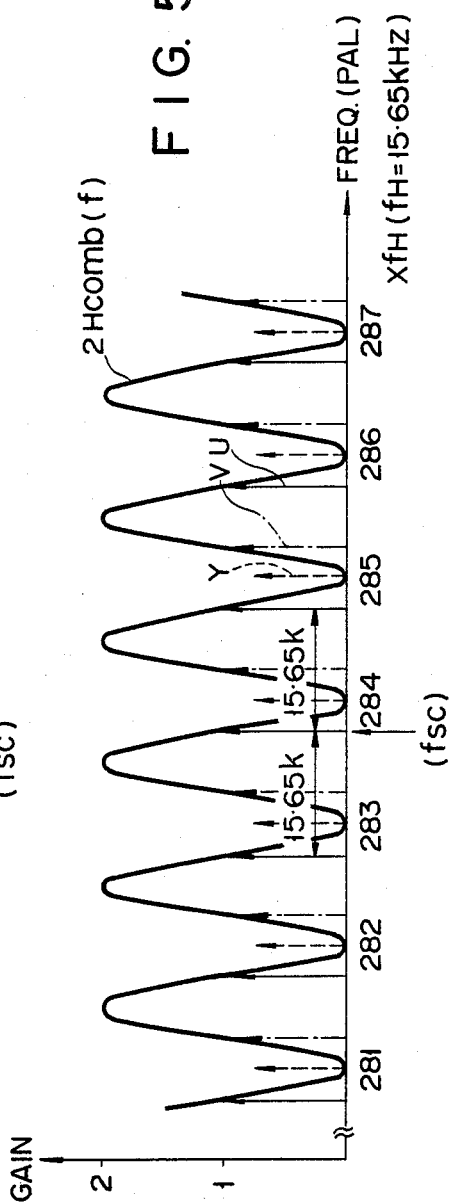

$f = 2fH (Hz)$
$F = 2 (cy./p.h)$ $f = fH (Hz)$
$F = 2 (cy./p.h)$ $f = O (Hz)$
$F = 1 (cy./p.h)$

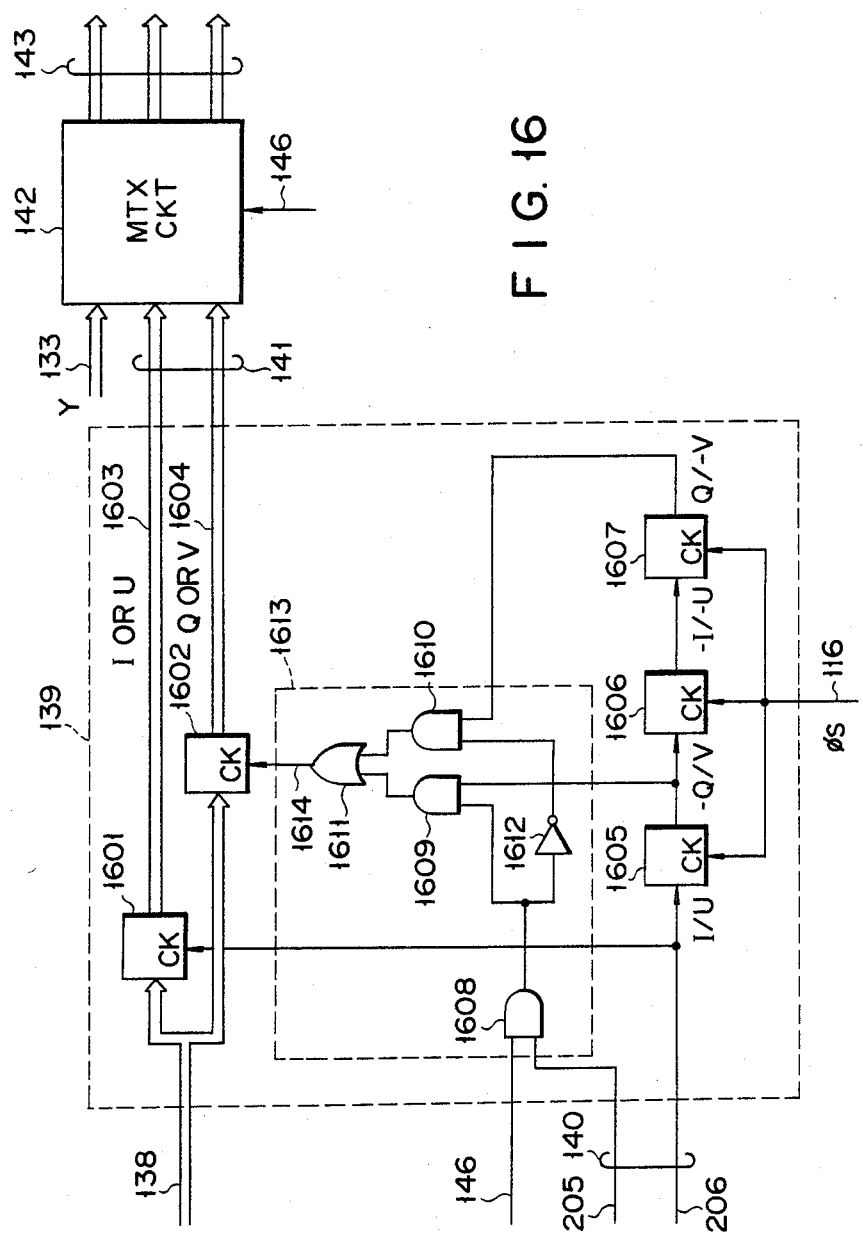
F I G. 16

ID_TV RECEIVER WITH DIGITAL VIDEO
PROCESSING CIRCUIT

BACKGROUND OF THE INVENTION

The present invention relates to a digital television receiver for performing digital processing of a baseband video signal and, more particularly, to a digital television receiver for improving resolution in a color killer mode.

In a conventional television receiver, all signals are analog-processed. Analog signal processing, however, has the problems at the video stage and thereafter. These problems stem from the general drawbacks of analog signal processing with regard to time-base operation, specifically, incomplete Y/C separation (which causes cross color and dot interference), various types of problems resulting in low picture quality, and low precision of synchronization. Furthermore, from the viewpoints of cost and ease of manufacturing the analog circuit, a hybrid configuration must be employed even if the main circuit comprises an IC. In addition to these disadvantages, many adjustments must be performed.

In order to solve the above problems, it is proposed to process all signals in a digital form from the video stage to the chrominance signal demodulation stage. In such a digital television receiver, various improvements in picture quality should result due to the advantages of digital signal processing.

SUMMARY OF THE INVENTION

It is accordingly an object of the present invention to provide a digital television receiver for improving picture quality, especially resolution of a picture in a color killer mode, which has never been seriously considered in a conventional television receiver based on analog signal processing.

In addition to the operation of the conventional television receiver wherein only the chrominance signal output supplied to a chrominance signal demodulator is set to be zero in the color killer mode, the digital television receiver of the present invention also uses the video signal as the luminance signal in the color killer mode. More particularly, in the Y/C separator for separating the chrominance and luminance signals of the video signal, the chrominance signal is separated from the video signal and is subtracted therefrom to obtain the luminance signal. When the color killer performs the color killer mode, that is, sets the chrominance signal to be supplied to the chrominance signal demodulator to zero, the color killer signal from the color killer indicates the color killer mode. Then, the video signal itself is used as the luminance signal output.

According to the present invention, since the video signal itself is used as the luminance signal in the color killer mode, the bandwidth of the luminance signal is widened to improve resolution of the picture. This effect is very conspicuous in the reception of a monochrome broadcast signal.

Furthermore, according to the present invention, since the video signal is processed by digital circuits, this results in simple circuit configuration for performing the color killer operation as described above. In the Y/C separator, the luminance signal is obtained by subtracting the chrominance signal from the video signal, so that the chrominance signal input to the subtractor is set to be zero in order to obtain the video signal per se as the luminance signal in the color killer mode. This can be achieved by inserting a simple gate at the chrominance signal input side of the subtractor.

A phase delay circuit may be inserted at the video signal input side of the subtractor so as to align the phase of the chrominance signal and that of the video signal. This delay circuit comprises a digital circuit, so that the circuit arrangement is very simple as compared with that of an analog delay circuit. Furthermore, the digital delay circuit is very suitable for delaying a video signal having a wide bandwidth.

BRIEF DESCRIPTION OF THE DRAWINGS

The drawings show the preferred embodiment of the present invention, in which

FIGS. 5A and 5B show waveforms for explaining characteristics of the comb filter;

FIG. 16 shows the detailed configuration of the chrominance signal demodulator of FIG. 1;

DETAILED DESCRIPTION OF THE PREFERRED EMBODIMENTS

Figure 1:
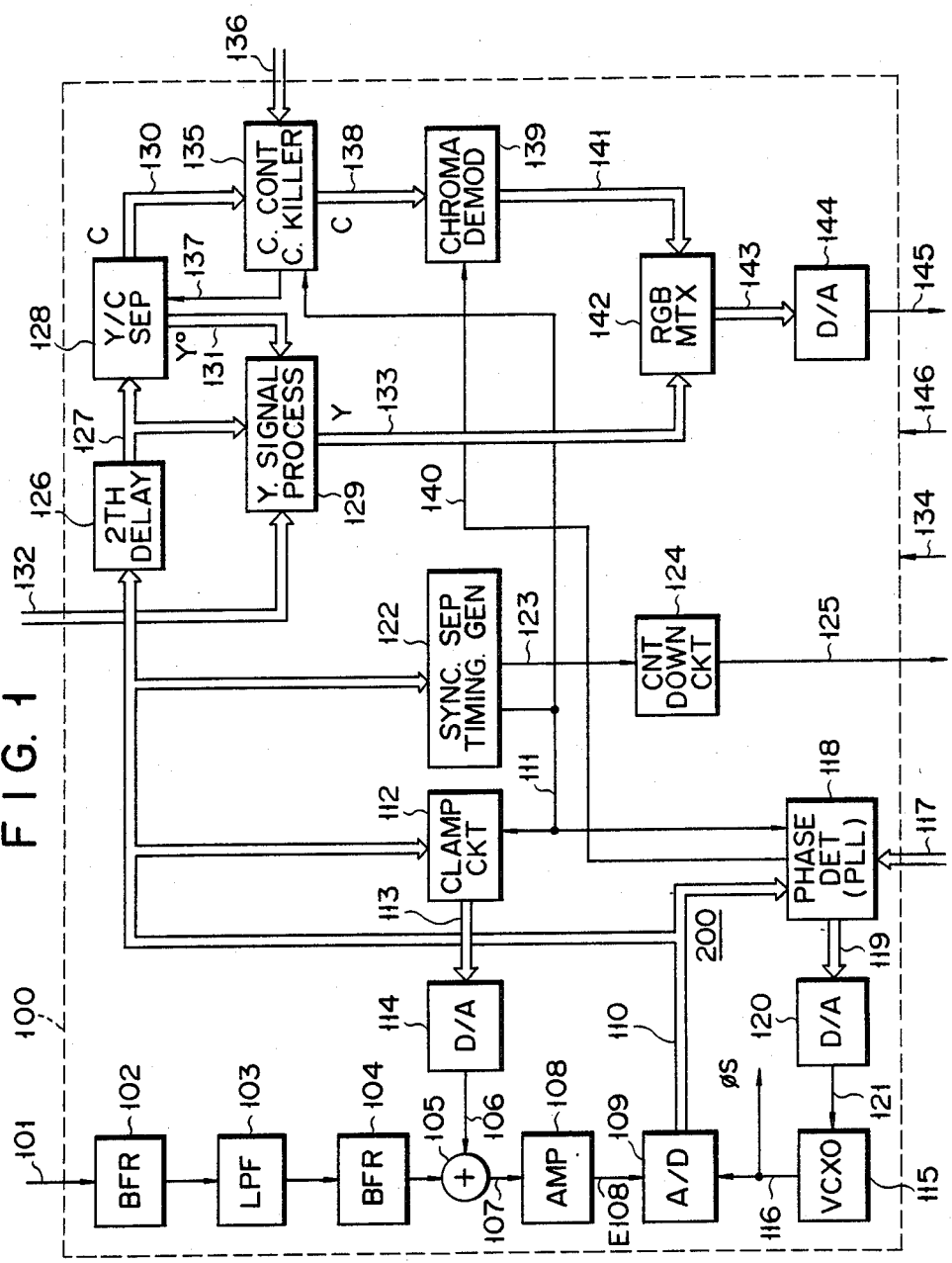
FIG. 1 shows the overall configuration of the video signal processing circuit.

FIG. 1 is a block diagram showing the overall configuration of a video signal processing circuit 100 for demodulating a base-band analog video signal by digital signal processing, thereby obtaining an analog RGB signal. Throughout in the drawings, a thin line indicates an analog signal line or a one-bit digital signal line, and a thick line indicates a line of a quantized digital signal having a plurality of bits. The digital television receiver of the embodiment according to the present invention can demodulate both NTSC and PAL video signals. Either the NTSC or the PAL signal mode may be manually selected. A general description of video signal processing circuit 100 will be made with reference to FIG. 1, and the detailed configuration will then be described.

(1) A/D Conversion and Clamp Circuit System, PLL Circuit System, Sync and Timing Circuit System An analog video signal 101 inputted to video signal processing circuit 100 is supplied to a low-pass filter (to be referred to as LPF hereinafter) 103 through a buffer 102. LPF 103 serves to eliminate high-frequency noise which results in a foldover distortion when an A/D converter (to be referred to as A/D hereinafter) 109 performs prescribed signal sampling. An output from LPF 103 is supplied to an adder 105 through a buffer 104 and is added to an analog clamp signal 106 therein. A composite signal 107 obtained from adder 105 is supplied to A/D 109 through an amplifier 108. A/D 109 samples an inputted composite signal E108 and converts it into a digital video signal 110. Amplifier 108 serves to amplify the amplitude of signal 107 in order to fully use a dynamic range of A/D 109.

A feedback control loop is constituted by, in order, A/D 109, a clamp circuit 112, a D/A converter (to be referred to as D/A hereinafter) 114, adder 105, amplifier 108, and A/D 109. This control loop serves to set the pedestal level of digital video signal 110 outputted from A/D 109 to a predetermined target value. In the control loop, clamp circuit 112 receives digital video signal 110 from A/D 109 and a burst extraction pulse 111 from a sync separator/timing generator 122 to be described later. In clamp circuit 112, an average value (pedestal level) of the burst component of digital video signal 110 is detected, a difference between the obtained pedestal level and the target value is detected, and the detected difference is produced as an error signal 113. Error signal 113 is converted by D/A 114 into analog clamp signal 106. Signal 106 is added by adder 105 (described above) to the output signal from buffer 104. As a result, a DC component of composite video signal 107 from adder 105 changes such that the pedestal level of signal 107 comes close to the target value. Signal 107 is then converted into digital video signal 110 through amplitude control amplifier 108 and sampling A/D 109. Digital video signal 110 is again supplied to clamp circuit 112, so that error signal 113 is detected again. Thus, pedestal clamping is performed.

On the other hand, A/D 109 samples the inputted signal in response to a sampling pulse ($\phi_S$) 116 from a voltage-controlled quartz oscillator (to be referred to as VCXO hereinafter) 115. In this embodiment, the frequency $f_S$ of sampling pulse ($\phi_S$) 116 is preset to $4f_{SC}$ (where $f_{SC}$ is the frequency of the chrominance subcarrier: $f_{SC}$=3.58 MHz in NTSC and $f_{SC}$=4.43 MHz in PAL). The hue components of the NTSC and PAL chrominance signals are respectively phase-modulated in response to the corresponding chrominance subcarriers. Therefore, the phase relationship between the sampling pulse ($\phi_S$) 116 and the color burst determines an axis for demodulating the chrominance signal. This relationship thus determines the hue of the picture. For these reasons, the phase of sampling pulse ($\phi_S$) 116 must be locked with that of the color burst. This control is performed by a phase-locked loop (PLL) constituted by, in order, A/D 109, a phase detector 118, a D/A 120, VCXO 115, and A/D 109. The control steps of this PLL loop are as follows.

Digital video signal 110 and burst extraction pulse 111 are supplied to phase detector 118. Phase detector 118 extracts the color burst component of video signal 110 in response to burst extraction pulse 111. A difference ($\theta - \theta_O$) between an actual sampling phase ($\theta$) of the color burst component and the phase target value 117 ($\theta_O$) is detected. The difference ($\theta - \theta_O$) is produced as a phase error signal 119. In practice, phase error signal 119 has a magnitude corresponding to $\sin(\theta - \theta_O)$ to be described later. Phase error signal 119 is converted by D/A 120 to an analog error signal which is applied as a VCXO control voltage 121 to VCXO 115. Therefore, the phase of sampling pulse ($\phi_S$) 116 is controlled to come close to that of phase target value ($\theta_O$) 117. When phase target value ($\theta_O$) 117 changes, hue control is performed (the detailed configuration of the PLL circuit will be described later). Sampling pulse ($\phi_S$) 116 is used as a reference signal in the video signal processing circuit 100.

Sync separator/timing generator 122 receives digital video signal 110 and generates a horizontal/vertical sync signal 123 as well as burst extraction pulse 111 in accordance with a prescribed operation. Burst extraction pulse 111 is supplied to clamp circuit 112 and phase detector 118, and horizontal/vertical sync signal 123 is supplied to a count-down circuit 124. Count-down circuit 124 counts down sampling pulse ($\phi_S$) 116 and produces a horizontal/vertical sync pulse 125. Horizontal/vertical sync pulse 125 is used to drive a CRT through a sync driver (not shown).

The sampling phase, pedestal level and amplitude of digital video signal 110 are controlled as mentioned above. Controlled digital video signal 110 is then supplied to an RGB demodulation/picture quality control system to be described below.

(2) RGB Demodulation/Picture Quality Control System

A $2T_H$ delay circuit 126 receives digital video signal 110 and delays it by $0T_H$, $1T_H$ and $2T_H$ ($T_H$: one horizontal period), respectively, to generate delayed signals 127.

Delayed signals 127 are used for various operations which employ line correlation to be performed later. It should be noted that the sampling frequency $f_S=4f_{SC}$ is given so that NTSC $f_S=910\ f_H$ and PAL $f_S=1135\ F_H$ and that the NTSC signal requires a delay time corresponding to 910 bits and the PAL signal requires a delay time corresponding to 1135 bits (where $f_H$: horizontal frequency $= 1/T_H$). Delayed signals 127 are supplied to a luminance signal/chrominance signal separator (to be referred to as Y/C separator) 128 and a Y signal processing circuit 129.

Y/C separator 128 has a comb filter for performing a line correlation operation using the $0T_H$-, $1T_H$- and $2T_H$-delayed signals 127, and a band-pass filter (to be referred to as BPF hereinafter) having a gain of "1" for $f = f_{SC}$. The comb filter and the band-pass filter separate a chrominance signal (to be referred to as C signal hereinafter) 130 from delayed signals 127. C signal 130 is then subtracted from the $1T_H$-delayed signal among delayed signals 127, thereby obtaining a luminance signal (to be referred to as Y° signal hereinafter) 131 (to be described in detail later).

Y signal processing circuit 129 receives delayed signals 127, Y° signal 131 and an externally supplied picture quality control signal 132. Y signal processing circuit 129 processes Y° signal 131 such that the horizontal and vertical contours, contrast, and brightness of Y° signal 131 are corrected. Y signal processing circuit 129 then produces an updated Y signal 133. It should be noted that a flyback pulse 134 is used for contrast correction (to be described in detail later).

C signal 130 is supplied to a color control/color killer 135. Color control/color killer 135 detects the burst amplitude of C signal 130 and performs color control/killer operation in accordance with this burst amplitude. A color killer signal 137 obtained by the operation of color control/color killer 135 is supplied to Y/C separator 128. In the color killer mode, the video signal per se is produced as Y° signal 131 so as to widen the bandwidth of Y° signal 131. In color control/color killer 135, the amplitude (color saturation) of C signal 130 is also controlled in accordance with an externally supplied color control signal 136 (to be described in detail later).

A C signal 138 from color control/color killer 135 is supplied to a chrominance signal demodulator 139. Chrominance signal demodulator 139 demodulates C signal 138 in synchronism with a chrominance signal demodulation control pulse 140 outputted from phase detector 118. In general, the sampling phase of A/D 109 is set along the I- and Q-axes in the NTSC system and along the U- and V-axes in the PAL system. Demodulated C signals 141 produced by chrominance signal demodulator 139 are I and Q signals in the NTSC mode or U and V signals in the PAL mode (to be described in detail later).

Y signal 133 and demodulated C signals 141 are supplied to an RGB matrix circuit 142 in which signals 133 and 141 are multiplied with a predetermined demodulation coefficient and are then added to each other, thereby obtaining an RGB signal 143. RGB signal 143 is converted by a D/A 144 to an analog RGB signal 145. Signal 145 is supplied to the CRT through an RGB output circuit (not shown).

It should be noted that the PAL and NTSC signals are switched when an NTSC/PAL switching signal 146 is supplied to a given circuit.

The main circuits in video signal processing circuit 100 in FIG. 1 will now be described in detail.

(PLL Circuit)

Figure 2:
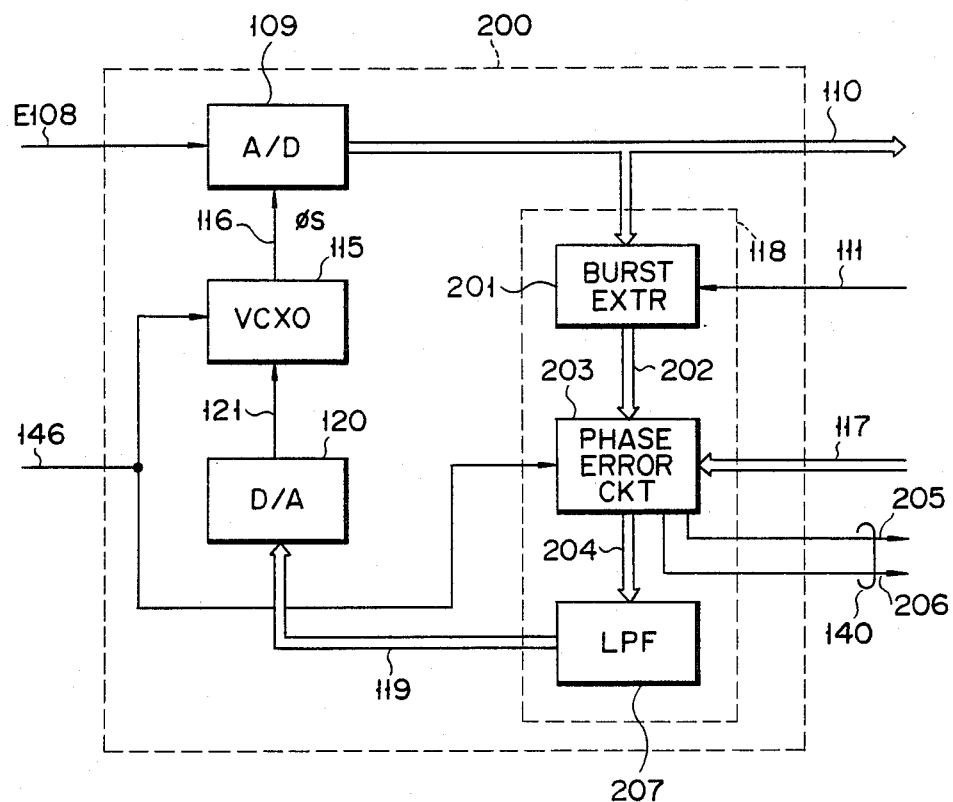
FIG. 2 shows the configuration of the PLL circuit of FIG. 1.
Figure 3:
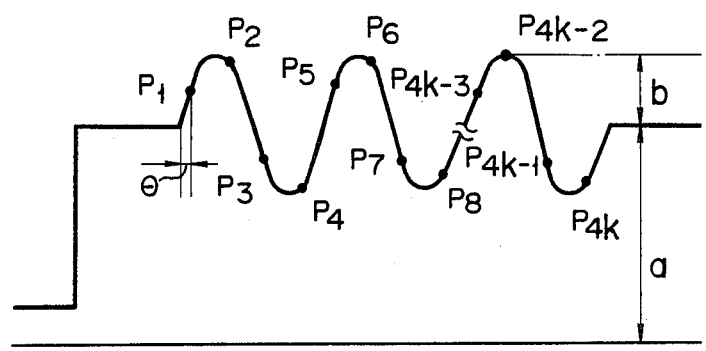
FIG. 3 is a waveform showing sampled points of the color burst.

FIG. 2 shows a detailed configuration of a PLL circuit 200 including phase detector 118. PLL circuit 200 serves to lock the phase of sampling pulse ($\phi_S$) 116 with the burst phase of signal E108, and to control the hue of the picture by using phase target value 117 being variable. Referring to FIG. 2, digital video signal 110 is supplied to a burst extractor 201 of phase detector 118 and is gated by extractor 201 in accordance with burst extraction pulse 111, so that a color burst 202 is extracted. Color burst 202 is supplied to a phase error operation circuit 203. A typical example of the phase error operation is described in detail in, for example, U.S. Pat. No. 4,291,332. FIG. 3 is a waveform for explaining this phase error operation. Sampled points $P_1$, $P_2$, ..., and $P_{4k}$ of the color burst component are illustrated. Color burst 202 in FIG. 2 is regarded as a data array of sampled points $P_1$ to $P_{4k}$. Sampled points $P_1$ to $P_{4k}$ are obtained by sampling a point being phase-shifted by $\theta$ from the burst phase for every 90°. Therefore, the sampled points can be given as follows:

$$P_{4n-3} = a + b \cdot \sin\theta$$

$$P_{4n-2} = a + b \cdot \sin(\theta + 90°)$$

$$P_{4n-1} = a + b \cdot \sin(\theta + 180°)$$

$$P_{4n} = a + b \cdot \sin(\theta + 270°), \text{ for } n = 1 \text{ to } k$$

When the target sampling phase is given as $\theta_0$, the following equation holds:

$$\sum_{n=1}^{k}(P_{4n-3} - P_{4n-1}) - \sum_{n=1}^{k}(P_{4n-2} - P_{4n})\tan\theta_0 = \quad (1)$$

$$2kb\sin(\theta - \theta_0)/\cos\theta_0$$

The right-hand side of equation (1) is a function of $(\theta - \theta_0)$ and can be considered to be a phase error signal 204. The left-hand side of equation (1) indicates the operation for obtaining phase error signal 204. When the operation indicated by the left-hand side of equation (1) is performed, phase error signal 204 of equation (1) is obtained. In the left-hand side of equation (1), data of the sampling phase $\theta_0$ is in the form of $\tan\theta_0$, so that the value $\tan\theta_0$ is used as phase target value 117 instead of the target sampling phase $\theta_0$. When the reference sampling phase of the NTSC signal is taken along the I-axis, the target sampling phase $\theta_0$ is $-57°$. Phase target value 117 is thus $\tan\theta_0 = -1.54$. On the other hand, when the reference sampling phase of the PAL signal is taken along the -U-axis (180°), since the burst phase is shifted by $180° \pm 45°$ for every line, the target sampling phase $\theta_0$ is $\pm 45°$. Therefore, phase target value 117 must be switched by $\tan\theta_0 = \pm 1$ for every line. This switching is detected by determining the sampling phase of the color burst to be $+45°$ or $-45°$. The switching signal is produced as a PAL ident signal 205. PAL ident signal 205 indicates that the V signal is modulated at a phase of $+90°$ or $-90°$. PAL ident signal 205 is used to demodulate the chrominance signal. For this reason, PAL ident signal 205 is supplied as the chrominance signal demodulation control pulse 140 together with a reference phase pulse 206 indicating the reference phase of sampling to chrominance signal demodulator 139 (in this embodiment, the reference phase of sampling matches the I-axis in the NTSC system and the U-axis in the PAL system).

Phase error signal 204 obtained by the operation indicated by the left-hand side of equation (1) is supplied to an LPF 207. LPF 207 serves to determine a time constant of PLL operation. In this case, the time constant is preset to be equal to several tens of $T_H$. An output 119 from LPF 207 is supplied to VCXO 115 through D/A 120 and serves to control the phase of sampling pulse ($\phi_S$) 116. VCXO 115 has one of oscillation frequencies of 14.3 MHz (NTSC) and 17.7 MHz (PAL) which are switched in accordance with NTSC/PAL switching signal 146.

The hue control in accordance with phase target value 117 will be described hereinafter. When the target sampling phase being determined from the burst phase is $\theta_0$, phase target value 117 is given by $\tan\theta_0$, as previously described in this embodiment. Therefore, when $\tan(\theta_0 + \theta_1)$ is used instead of $\tan\theta_0$, the demodulation axis is shifted by $\theta_1$, and the hues of all colors are changed by the same phase in the same direction. The operation for hue control is indicated by the second term of the left-hand side of equation (1). Specifically the value $$\sum_{n=1}^{k} (P_{4n-2} - P_{4n})$$

obtained from color burst 202 and phase target value ($\tan\theta_0$) 117 are multiplied together. Therefore, a circuit additionally used for hue control may comprise a single multiplier. The method for changing the hue in accordance with a change in the demodulation axis is the same as that in a conventional analog color television.

There are two other methods for controlling the hue: one is a method in which the gains of demodulated C signals 141 (I and Q or U and V) change; and the other is a method in which a demodulation coefficient changes in RGB matrix circuit 142. In the former method, gain adjustment is performed for two signals, so that the size of hardware (the number of multipliers) is increased. In addition to this disadvantage, since the different hues change differently (an amount and a direction), complex control is required. In the latter method, six demodulation coefficients are used in the matrix circuit for each of the NTSC and PAL signals, so that the size of the hardware is further increased and further complex control is required, as compared with the former method. Therefore, even in the hue control of the digital television receiver, the method of changing the demodulation axis is more suitable in consideration of the size of hardware and the degree of complexity of the control operation.

(Y/C Separator)

Referring to FIG. 1, $2T_H$ delay circuit 126 and Y/C separator 128 serve to separate C and Y° signals 130 and 131 of digital video signal 110. $2T_H$ delay circuit 126 and Y/C separator 128 constitute a Y/C separation filter.

Figure 4:
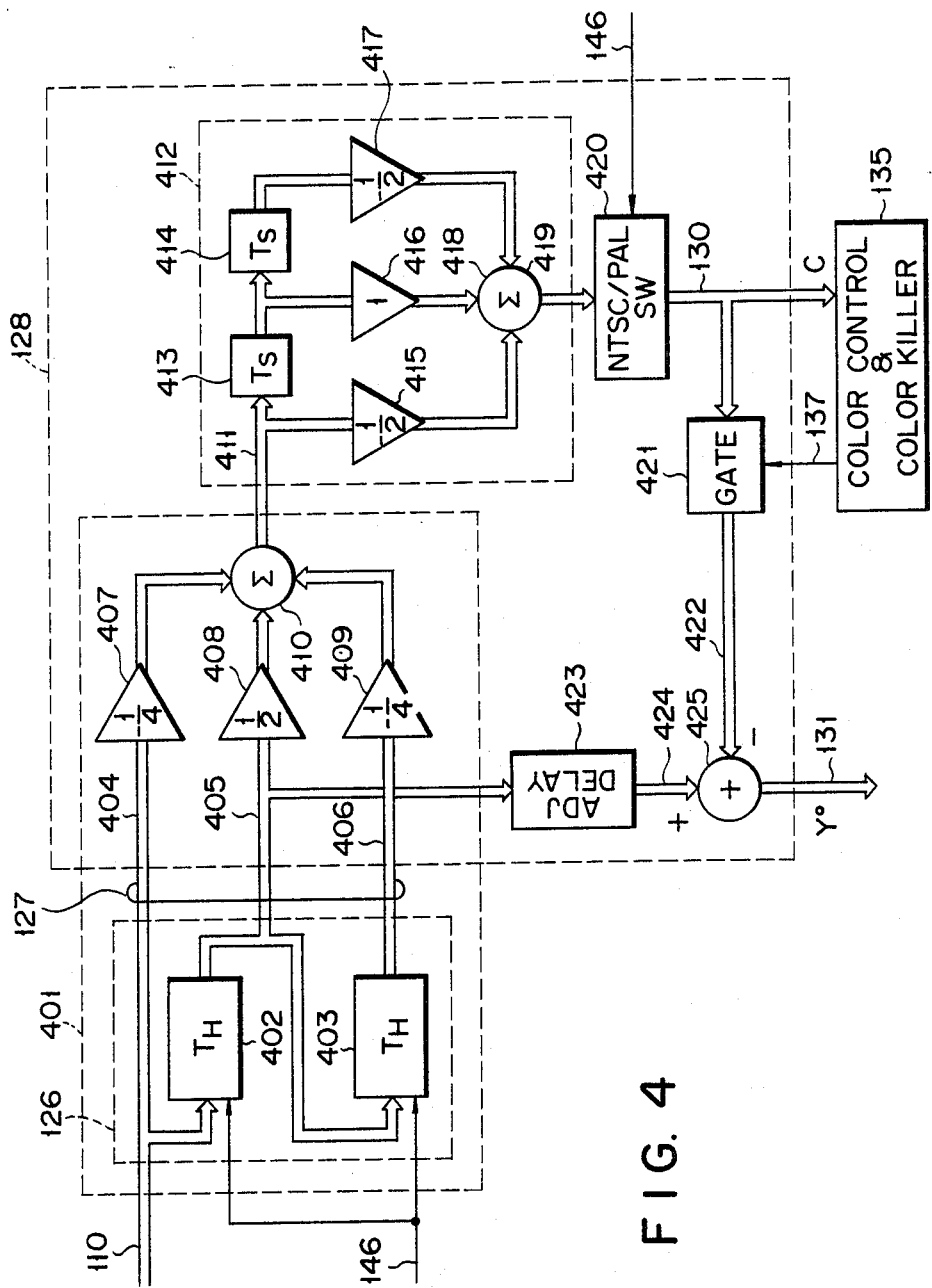
FIG. 4 is a block diagram showing the configuration of the Y/C separator of FIG. 1.

FIG. 4 shows a detailed configuration of $2T_H$ delay circuit 126 and Y/C separator 128. Referring to FIG. 4, the operation for separating digital video signal 110 into C signal 130 and Y° signal 131 will now be described. A comb filter 401 is connected in series with a C signal band-pass filter 412. Comb filter 401 has a periodicity of $f_H$ and has zero transfer function or zero gain for $f=nf_H$ (n, ... 1, 2, ... ). BPF 412 has a gain of 1 for $f=f_{SC}$. Comb filter 401 and BPF 412 serve to extract a C signal 419 included in a $1T_H$-delayed signal 405. C signal 419 is produced as C signal 130 through an NTSC/PAL switching circuit 420. C signal 130 is supplied to a subtractor 425 through a C signal gate 421. On the other hand, $1T_H$-delayed signal 405 having a phase corresponding to the phase center of comb filter 401 is supplied to subtractor 425 through a phase delay circuit 423. Circuit 423 delays the phase (corresponding to the delay time) of $1T_H$-delayed signal 405 so as to be aligned the phase of signal 405 with that of C signal 130. Subtractor 425 subtracts a C signal 422 gated through gate 421 from a video signal 424 obtained from delay circuit 423, thereby obtaining Y° signal 131.

The operation of the circuit shown in FIG. 4 will be described in detail. $2T_H$ delay circuit 126 has a series circuit of $1T_H$ delay circuits 402 and 403. The delay time of each of the $1T_H$ delay circuits is switched between 910 $T_S$ (NTSC) and 1135 $T_S$ (PAL), where $T_S$ is the sample period such that $T_S=1/f_S=\frac{1}{4}f_{SC}$. The delayed signals from $2T_H$ delay circuit 126 comprise a $0T_H$-delayed signal (no delay) 404, $1T_H$-delayed signal 405 and a $2T_H$-delayed signal 406, and are supplied as delayed signals 127 to Y/C separator 128.

Delayed signals 127 are filtered through comb filter 401 in Y/C separator 128. More particularly, $0T_H$-, $1T_H$- and $2T_H$-delayed signals 404, 405 and 406 are multiplied by multipliers 407, 408 and 409 with given coefficients $-\frac{1}{4}$, $\frac{1}{2}$ and $-\frac{1}{4}$, respectively. These multiplied signals are added to each other by an adder 410. Adder 410 then provides an added signal 411. The coefficients $-\frac{1}{4}$ and $\frac{1}{2}$ are numbers of power of 2, so that coeffcient multipliers 407, 408 and 409 need not comprise special multipliers, but can be obtained by wiring operations, and the negative coefficients can be obtained by adapting respective inverters. The frequency characterisitic $H_{comb}(f)$ of comb filter 401 is given as follows:

$$H_{comb}(f) = (-\tfrac{1}{4})Z^{-TH/TS} + \tfrac{1}{2} + (-\tfrac{1}{4})Z^{+TH/TS} = \quad (2)$$

$$(\tfrac{1}{2})\{1 - \cos(2\pi f/f_H)\} \text{ for } Z = e^{-j\cdot 2\pi fTS}$$

C signal 411 can be separated in accordance with characteristics $H_{comb}(nf_H)=0$ and $H_{comb}\{(n+\tfrac{1}{2})f_H\}=1$. BPF 412 for C signal 130 comprises $1T_S$-delayed circuits 413 and 414, coefficient multipliers 415, 416 and 417, and an adder 418. Coefficient multipliers 415, 416 and 417 can be obtained in accordance with proper wiring and the addition of inverters. The frequency characteristic $H_{BPF}(f)$ of BPF 412 is given as follows:

$$H_{BPF}(f) = (-\tfrac{1}{2})Z^{-1} + 1 + (-\tfrac{1}{2})Z^{+1} \quad (3)$$

$$= 1 - \cos(\pi f/2f_{SC})$$

BPF 412 can be obtained by using simple hardware, so that its frequency characteristic can be given by simple equation (3). Furthermore, since BPF 412 is used together with comb filter 401, Y/C separation can be properly performed even though only simple hardware is used. An output from BPF 412 is supplied to NTSC/PAL switching circuit 420.

NTSC/PAL switching circuit 420 passes C signal 419 per se when NTSC/PAL switching signal 146 indicates the NTSC mode. However, when NTSC/PAL switching signal 146 indicates the PAL mode, NTSC/PAL switching circuit 420 doubles the amplitude of C signal 419 and generates this doubly amplified signal as C signal 130. The switching operation of NTSC/PAL switching circuit 420 is based on the following. The frequency characteristic $H_{comb}(f)$ of comb filter 410 is given by equation (2) irrespective of the NTSC and PAL modes: $H_{comb}(nf_H)=0$, $H_{comb}\{(n\pm\tfrac{1}{4})f_H\}=0.5$, and $H_{comb}\{(n+\tfrac{1}{2})f_H\}=1$. Since the C signal has a frequency near $f=(n+\tfrac{1}{2})f_H$, the C signal can be separated using the frequency characteristic indicated by equation (2) without modification.

FIG. 5(a) shows the relationships among the Y signal spectrum (dotted arrows), the C signal spectrum (solid arrows), and the characteristic $H_{comb}(f)$ in the NTSC mode. On the other hand, in the PAL mode, the Y signal has a frequency corresponding to $f=nf_H$, the U signal in the C signal has a frequency corresponding to $f=(n-\tfrac{1}{4})f_H$, and the V signal has a frequency corresponding to $f=(n+\tfrac{1}{4})f_H$. When the frequency characteristic indicated by equation (2) is used without modification, the gain of the C signal for $f=(n\pm\tfrac{1}{4})f_H$ becomes halved. Therefore, when the gain of the $H_{comb}(f)$ is doubled, a proper C signal can be separated. FIG. 5(b) shows the relationships among the Y signal spectrum (dotted arrows), the U signal spectrum (solid arrows), the V signal spectrum (alternate long and short dashed line) and the characteristic 2·$H_{comb}(f)$. Referring to FIG. 5(b), the gain at $f=(n+\frac{1}{2})f_H$ is doubled. However, this gain corresponds to the vertical high-frequency component of the C signal and thus can be neglected. On the other hand, $H_{BPF}(f)$ has a gain of 1 at $f=f_{SC}$ for both the NTSC and PAL signals in accordance with equation (3). Therefore, the characteristic $H_{BPF}(f)$ can be commonly used in the NTSC and PAL modes. When a combination of comb filter 401 and BPF 412 is considered, the characteristic $H_{comb}(f)\cdot H_{BPF}(f)$ is used for the NTSC signal, whereas the characteristic $2H_{comb}(f)\cdot H_{BPF}(f)$ is used for the PAL signal.

Figure 6:
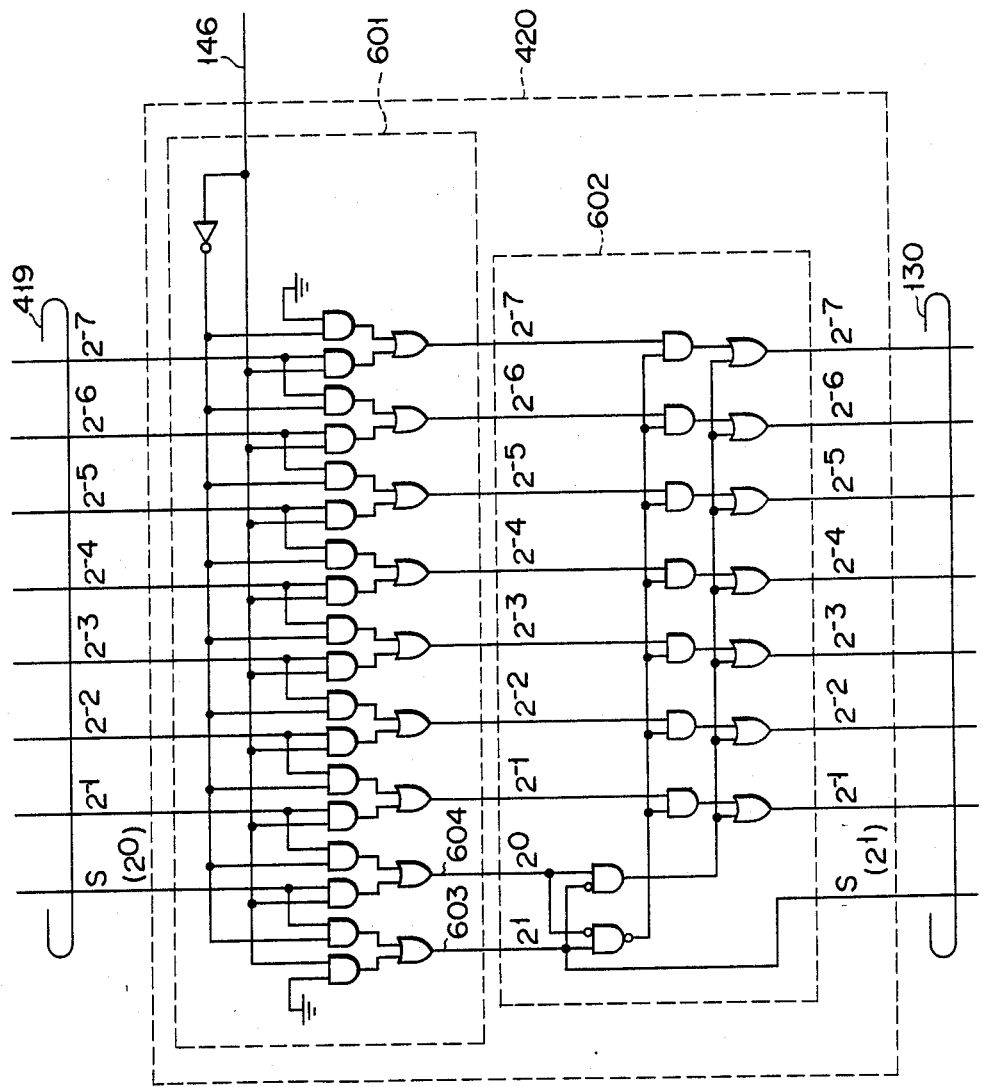
FIG. 6 shows the detailed configuration of the NTSC/PAL switching circuit of FIG. 4.

NTSC/PAL switching circuit 420 comprises a gain switching circuit 601 and an overflow/underflow prevention circuit 602, as shown in FIG. 6. NTSC/PAL switching signal 146 is set at logic level "1" in the PAL mode and at logic level "0" in the NTSC mode. Gain switching circuit 601 passes C signal 419 therethrough in the NTSC mode in accordance with a predetermined gate arrangement. However, in the PAL mode, C signal 419 is shifted by one bit toward the MSB side and is thus doubled. Overflow/underflow prevention circuit 602 receives output signals from gain switching circuit 601. When the signals have a binary weighting of $2^0(=1)$ or more, overflow/underflow prevention circuit 602 clamps the signals to a binary weighting which falls within a range of $2^0$ to $2^{-7}$. However, when the signals having a binary weighting of $-2^0$ or less are supplied to overflow/underflow prevention circuit 602, these signals are clamped to $-2^0$.

Overflow/underflow prevention circuit 602 is arranged for the following reason. The characteristic $H_{comb}(f)\cdot H_{BPF}(f)$ may exceed a gain of 1 within a video signal frequency range. In particular, the C signal is doubled in the PAL mode, so that the output signals from gain switching circuit 601 in accordance with a given picture pattern may fall outside the posible maximum range of $-2^0$ to $(2^0-2^{-7})$. In other words, if overflow/underflow prevention circuit 602 is not used, signals having a binary weighting of $2^0$ or more are regarded as negative signals. Similarly, signals having a binary weighting of $-2^0$ or less are regarded as positive signals. Using a predetermined gate arrangement, overflow/underflow prevention circuit 602 detects a $2^1$ bit 603 and a $2^0$ bit 604 of the input signals. When bits 603 and 604 are set at logic levels "0" and "1", respectively, overflow/underflow prevention circuit 602 determines that an overflow occurs, and generates signals having a weighting which falls within the range of $2^0$ to $2^{-7}$. However, when bits 603 and 604 are set at logic levels "1" and "0", overflow/underflow prevention circuit 602 determines that an underflow occurs, and generates signals having a weighting corresponding to $-2^0$.

The NTSC/PAL switching system has an advantage in that NTSC/PAL switching circuit 420 may be made only by 40 to 50 gates.

Referring to FIG. 4, C signal 130 from NTSC/PAL switching circuit 420 is supplied to color control/color killer circuit 135 and to C signal gate 421. Gate 421 also receives color killer signal 137 from color control/color killer circuit 135. Gate 421 is closed in the color killer mode so as to prevent the supply of C signal 422 to subtractor 425. Therefore, in the color killer mode, video signal 424 per se is used as Y° signal 131. In the conventional color killer operation, C signal 130 is set at logic level "0". However, as previously described, the color killer operation is also applied to Y/C separator 128 in this embodiment. For this reason, a bandwidth limit imposed upon Y° signal 131 is eliminated in the color killer mode, thereby widening the bandwidth.

The above description may be summarized concerning Y signal separation as follows. A Y signal separation characteristic $H_Y(f)$ used for separating Y° signal 131 from video signal 424 is given as follows:

$$H_Y(f) = \begin{cases} 1 - H_{comb}(f)\cdot H_{BPF}(f) & \text{for NTSC mode} \\ 1 - 2\cdot H_{comb}(f)\cdot H_{BPF}(f) & \text{for PAL mode} \\ 1 \text{ (full-band through filter)} & \text{for color killer operation} \end{cases}$$

Y° signal 131 is supplied to Y signal processing circuit 129.

(Y Signal Processing Circuit)

The Y signal processing circuit 129 corrects the horizontal and vertical profiles, contrast, and brightness of the Y signal 131, and supplies the updated or corrected Y signal to the matrix circuit 142.

Figure 7:
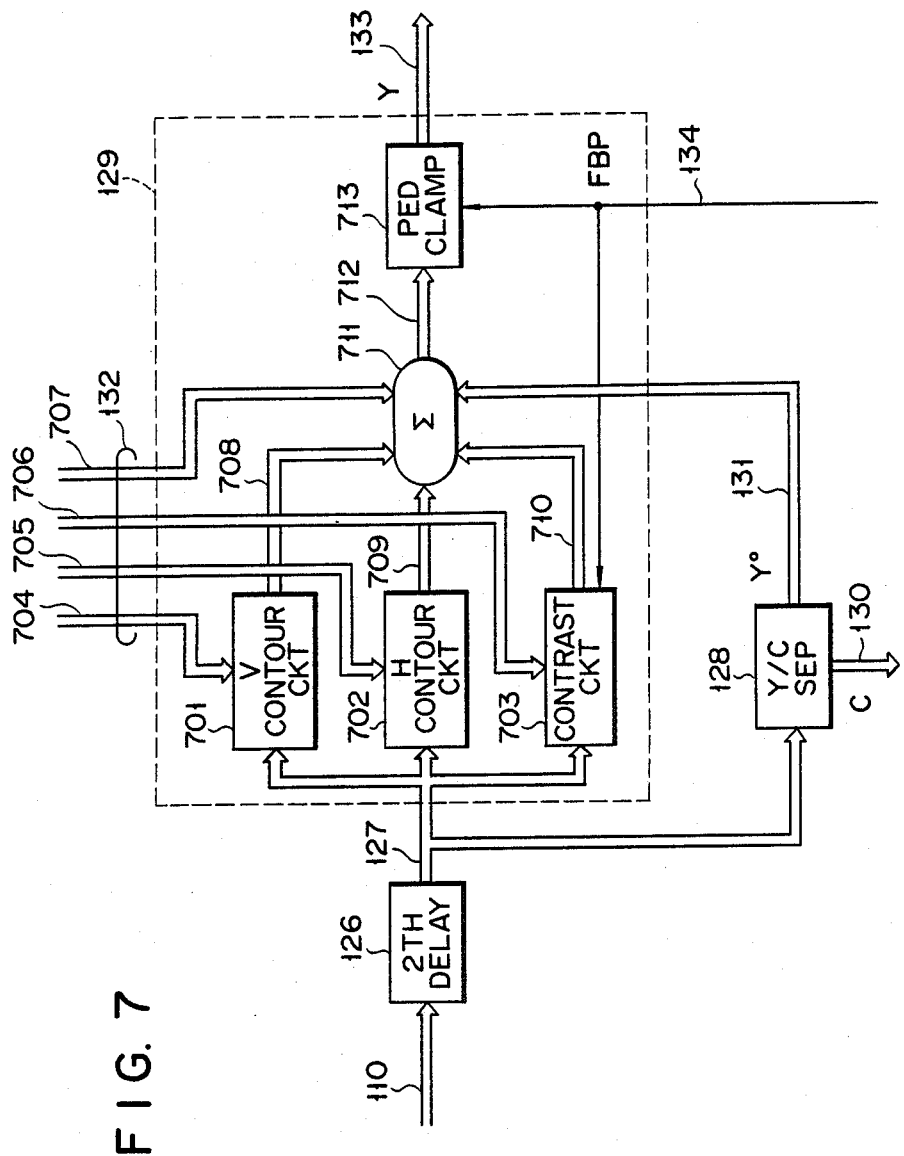
FIG. 7 shows the detailed configuration of the Y signal processing circuit of FIG. 1.

FIG. 7 shows a detailed configuration of Y signal processing circuit 129. Y signal processing circuit 129 comprises a vertical contour circuit 701, a horizontal contour circuit 702, a contrast circuit 703, an adder 711 and a pedestal clamp circuit 713. Picture quality control signal 132 includes a vertical contour control signal 704, a horizontal contour control signal 705, a contrast control signal 706, and a brightness control signal 707. Delayed signals 127 from $2T_H$ delay circuit 126 are supplied to vertical and horizontal contour circuits 701 and 702 and to contrast circuit 703. Vertical and horizontal contour circuits 701 and 702 and contrast circuit 703 generate signals 708, 709 and 710, respectively. The gains of circuits 701 to 703 are controlled by the signals 704, 705 and 706, respectively. Vertical and horizontal contour signals 708 and 709 and contrast signal 710 are added by adder 711 to the externally supplied $Y^O$ signal 131. Adder 711 then supplies an added result as a Y signal 712 to pedestal clamp circuit 713. Adder 711 and pedestal clamp circuit 713 together perform brightness control wherein a DC component of $Y^O$ signal 131 is controlled in accordance with brightness control signal 707. The vertical and horizontal contours, contrast and brightness of $Y^O$ signal 131 are corrected, and updated Y signal 133 is produced. Y signal 133 is supplied to matrix circuit 142 (FIG. 1). The components of Y signal processing circuit 129 will be described in detail hereinafter.

(1) Vertical Contour Circuit

Figure 8:
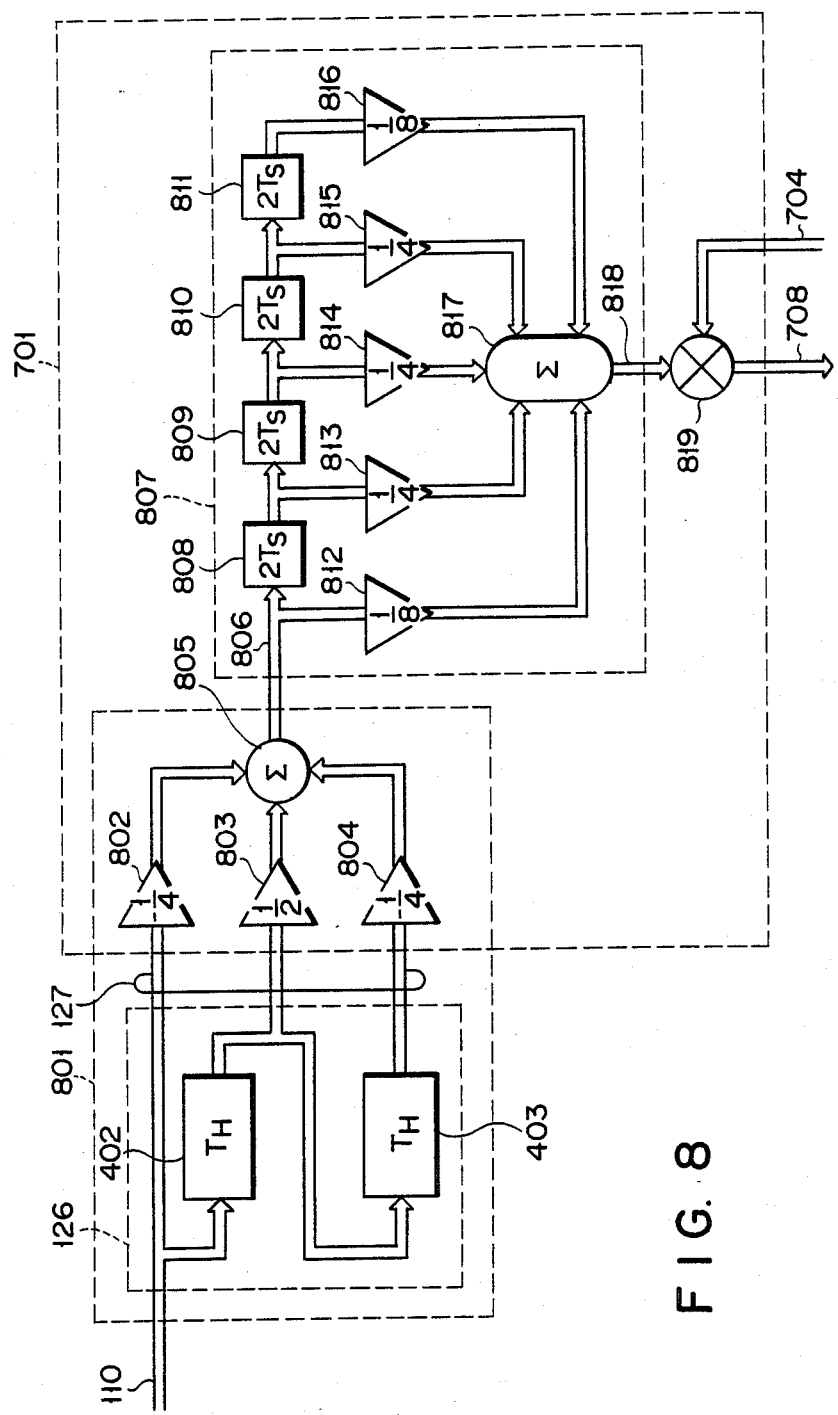
FIG. 8 shows the detailed configuration of the vertical contour circuit of FIG. 7.

FIG. 8 shows a detailed configuration of vertical contour circuit 701. Vertical contour signal 708 is prepared by $2T_H$ delay circuit 126 and vertical contour circuit 701. Vertical contour circuit 701 comprises a series circuit of a vertical HPF 801 of a comb filter arrangement and an LPF 807. Vertical HPF 801 serves to filter a component having a large vertical variation on the TV screen. An output signal 806 from vertical HPF 801 includes the vertical contour component. Vertical HPF 801 and the vertical frequency will be briefly described hereinafter. Vertical HPF 801 has the same arrangement as comb filter 401 (FIG. 4) for separating C signal 411 from video signal. In practice, comb filter 401 (FIG. 4) is also used as vertical HPF 801, but they are separately described for descriptive convenience. Coefficient multipliers 802 to 804 and an adder 805 (FIG. 8) correspond to coefficient multipliers 407 to 409 and the adder 410 (FIG. 4), respectively. Vertical HPF 801 is the same as comb filter 401 since the C signal has a vertical high-frequency component. The vertical frequency indicates the vertical repetition on the screen in units of cycle/picture hight (to be referred to as cy./p.h. hereinafter).

FIG. 10 shows a representation for explaining the relationship among the vertical frequency F (cy./p.h.), the normally used frequency f (Hz) (to be referred to as a horizontal frequency in order to distinguish between the vertical frequency F and the normally used frequency f), and a picture pattern. The vertical frequency corresponds to a vertical change in picture pattern, whereas the horizontal frequency corresponds to a horizontal change in picture pattern. The horizontal frequency f and the vertical frequency F are plotted on a two-dimensional coordinate system and are often called a two-dimensional frequency.

Figure 10C:
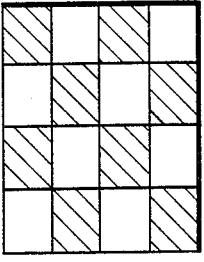
FIGS. 10A, 10B, 10C show diagrams for explaining the relationship among the picture, the horizontal frequency and the vertical frequency.
Figure 10B:
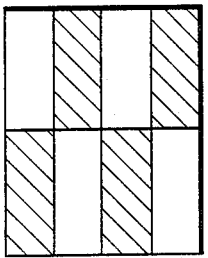
Figure 10A:
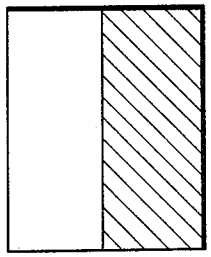
Figure 11:
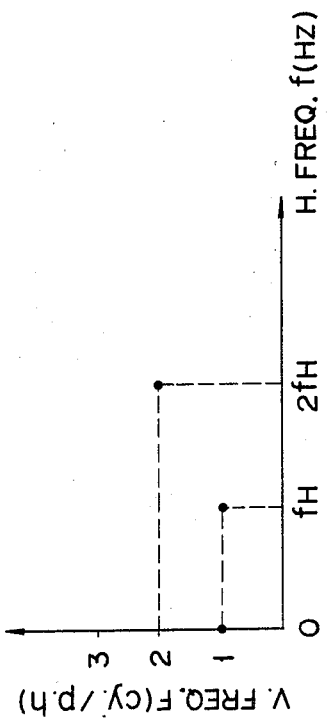
FIG. 11 is a diagram for explaining the two-dimensional frequency.

FIG. 11 shows a two-dimensional frequency being formed of frequency components respectively corresponding to picture patterns in FIGS. 10(a), 10(b) and 10(c).

Figure 12:
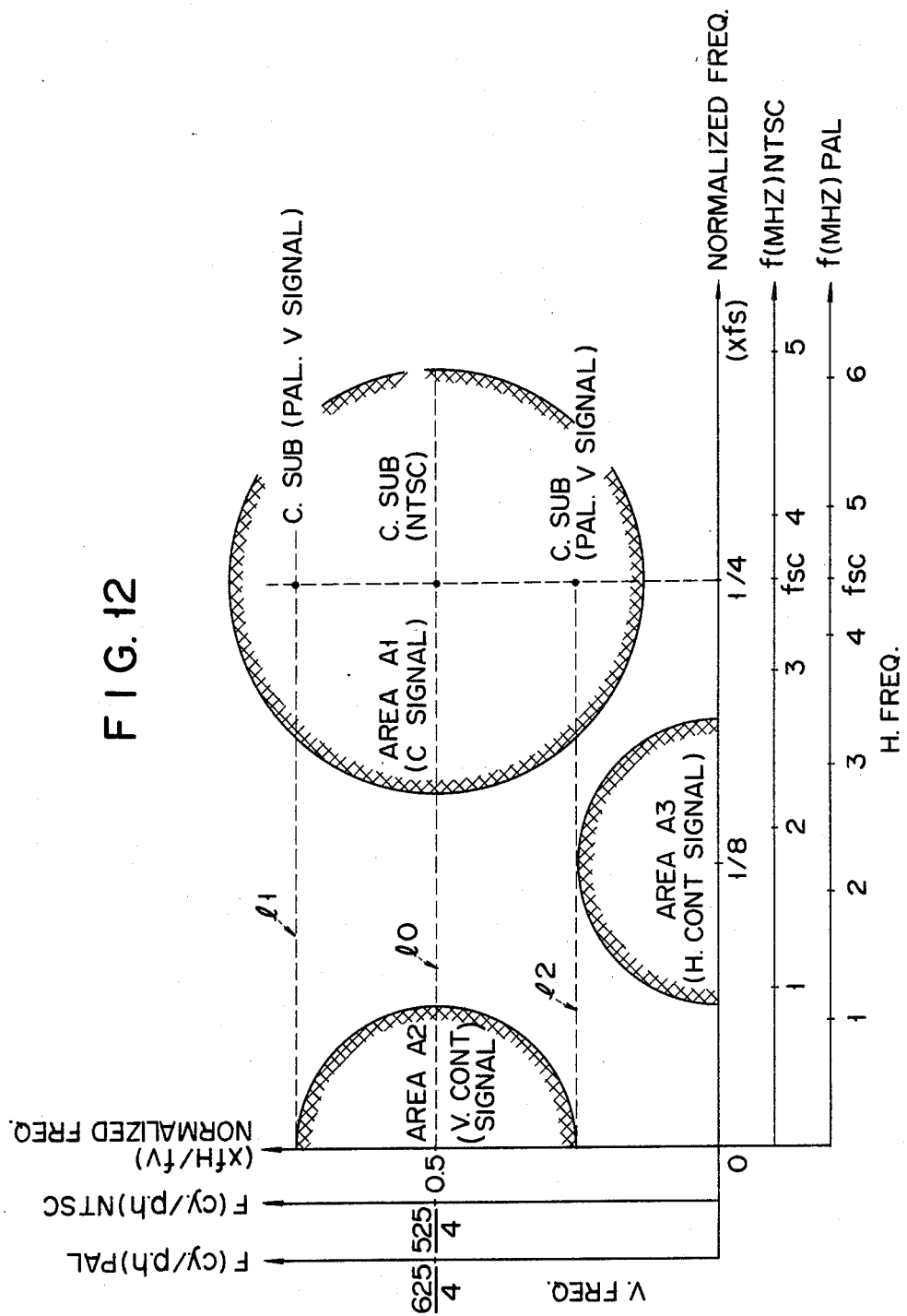
FIG. 12 is a diagram showing the television signal in the two-dimensional frequency form.

FIG. 12 is a graph showing the television signal in a two-dimensional frequency form. The normalized frequency scale is commonly used for the NTSC and PAL systems. The horizontal frequency is normalized by the sampling frequency $f_S$ ($=4f_{SC}$). The vertical frequency is normalized by the scanning lines $f_H/f_V$ (where $f_V$ is the field frequency) for one field. In general, the vertical frequency F (cy./p.h.) of a signal whose frequency is given by $f(Hz)=(n+a)f_H$ becomes $F=(f_H/f_V)a$ where $n=$a natural number, $1>a>0$, and $f_V$ is the field frequency. The vertical frequency of the NTSC chrominance subcarrier is $525/4=131.25$ (cy./p.h.), the vertical frequency of the U signal in the PAL mode is $625/8=78.125$ (cy./p.h), and the vertical frequency of the V signal is $625\times\frac{3}{8}=234.375$ (cy./p.h.). The horizontal frequency of the chrominance subcarrier differs in the NTSC and PAL modes. However, the horizontal frequencies of the NTSC and PAL chrominance subcarriers can be expressed by a normalized frequency as $f_S/4$. Black dots in FIG. 12 indicate NTSC and PAL subcarriers. An area $A_1$ in FIG. 12 shows an approximate frequency range of the C signal.

The characteristic of vertical HPF 801 will be described. The frequency characteristic of vertical HPF 801 is the same as that ($H_{comb}\{f(Hz)\}$) indicated by equation (2) and is expressed using the vertical frequency F as follows:

$$H_{comb}(F)=\{1-\cos (2\pi f_V \cdot F/f_H)\}/2 \ldots \quad (4)$$

The characteristic given by equation (4) is constant along the axis of horizontal frequency and changes only along the axis of vertical frequency. The gain in this change is zero at $F=0$ and is sinusoidally increased to reach "1" at $F=0.5\times f_H/f_V$. The bandwidth of vertical HPF 801 corresponds to an area surrounded by a dotted line $l_1$ and a dotted line $l_2$ in FIG. 12 (the dotted line $l_1$ indicates $F=0.75 \cdot f_H/f_V$, and the dotted line $l_2$ indicates $F=0.25 \cdot f_H/f_V$). It should be noted that the vertical frequency $F=0.5(f_H/f_V)$ corresponds to a zigzag picture pattern repeated for every line and has a mirror symmetry about $F=0.5 \cdot f_H/f_V$ (a dotted line $l_0$).

Referring again to FIG. 8, output signal 806 from vertical HPF 801 is supplied to LPF 807 to eliminate the C signal component (the area $A_1$ in FIG. 12) included in output signal 806. LPF 807 comprises $2T_S$ delay circuits 808 to 811, coefficient multipliers 812 to 816, and an adder 817, and has a low-pass filtration characteristic (bandwidth of about 1 MHz). By this characteristic, the C signal included in signal 806 is substantially eliminated together with the high-frequency component of the C signal. The bandwidth of the filter constituted by a series circuit of vertical HPF 801 and LPF 807 is indicated by an area $A_2$ in FIG. 12. This bandwidth corresponds to the bandwidth of a vertical contour signal 818. When the C signal is not completely eliminated, vertical contour correction results in dot interference in a portion subjected to a great change in color, thus degrading image quality.

Another method for obtaining the vertical contour signal is proposed wherein the Y signal is filtered through a vertical HPF. However, in general, the Y signal has a wide bandwidth. When the Y signal is supplied to the vertical HPF, the C signal leaks considerably, resulting in dot interference. According to the present embodiment, LPF 807 having a narrow bandwidth is combined with vertical HPF 801 so as to prepare the vertical contour signal 818 independently of $Y_O$ signal 131. Vertical contour signal 818 and vertical contour control signal 704 are multiplied by a multiplier 819 so as to control the gain of the vertical contour signal 818. Thereafter, a corrected signal is produced as the vertical contour signal 708.

(2) Horizontal contour Circuit

Figure 9:
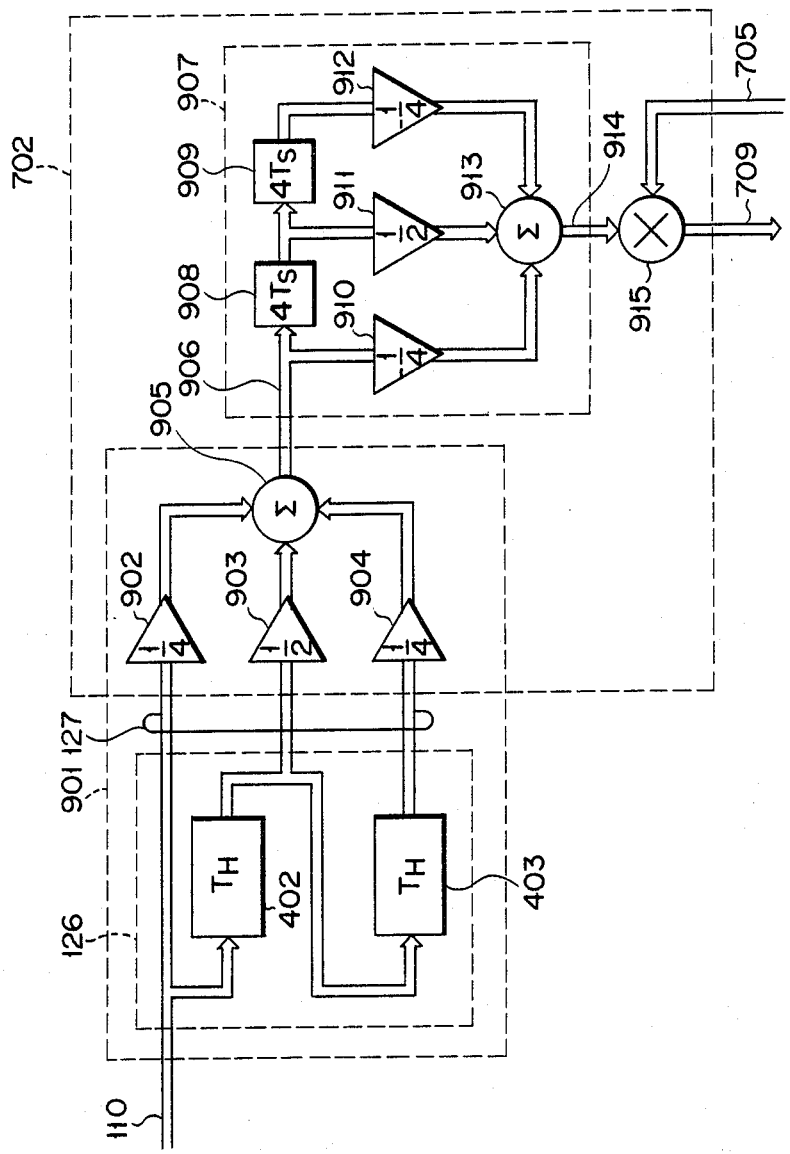
FIG. 9 shows the detailed configuration of the horizontal contour circuit of FIG. 7.

FIG. 9 shows the configuration of horizontal contour circuit 702. Horizontal contour signal 709 is prepared by $2T_H$ delay circuit 126 and horizontal contour circuit 702. Horizontal contour circuit 702 comprises a series circuit of a vertical LPF 901 of a comb filter arrangement and a BPF 907. Vertical LPF 901 comprises $2T_H$ delay circuit 126, coefficient multipliers 902 to 904, and an adder 905, and has a characteristic opposite to that of vertical HPF 801 (FIG. 8). A vertical frequency characteristic $H_{VLPF}(F)$ of vertical LPF 901 is given as follows:

$$H_{VLPF}(F)=\{1-\cos (2\pi f_V \cdot F/f_H)\}/2$$

This bandwidth corresponds to an area below the dotted line $l_2$ in FIG. 12 (and actually, also to an area above the dotted line $l_1$). An output signal 906 from vertical LPF 901 is supplied to BPF 907. BPF 907 comprises $4T_S$ delay circuits 908 and 909, coefficient multipliers 910 to 912, and an adder 913, and has a center frequency $f_S/8$ (1.8 MHz in the NTSC mode, and 2.2 MHz in the PAL mode) and a filtration bandwidth $\pm f_S/16$ (0.9 MHz in the NTSC mode, and 1.1 MHz in the PAL mode). BPF 907 serves to extract the horizontal contour signal of the picture pattern in the vicinity of 2 MHz. The filtration bandwidth of the filter constituted by a series circuit of vertical LPF 901 and BPF 907 corresponds to an area $A_3$ in FIG. 12.

In general, in order to prepare the horizontal contour signal, the Y signal is filtered through a 2-MHz BPF. However, the vertical frequency of the Y signal has a wide bandwidth, so that the C signal (area $A_1$ in FIG. 12) may substantially leak into the horizontal contour signal. When horizontal contour correction is performed, dot interference occurs in a portion which is subject to a great change in color. However, according to this embodiment, a combination of BPF 907 for extracting the horizontal contour component and vertical LPF 901 for preventing leakage of the C signal is used to separate a horizontal contour signal 914. Horizontal contour signal 914 and horizontal contour control signal 705 are multiplied by a multiplier 915. The amplitude of horizontal contour signal 914 is thus controlled, and the corrected signal is produced as vertical contour signal 709.

(3) Contrast Circuit

Figure 13:
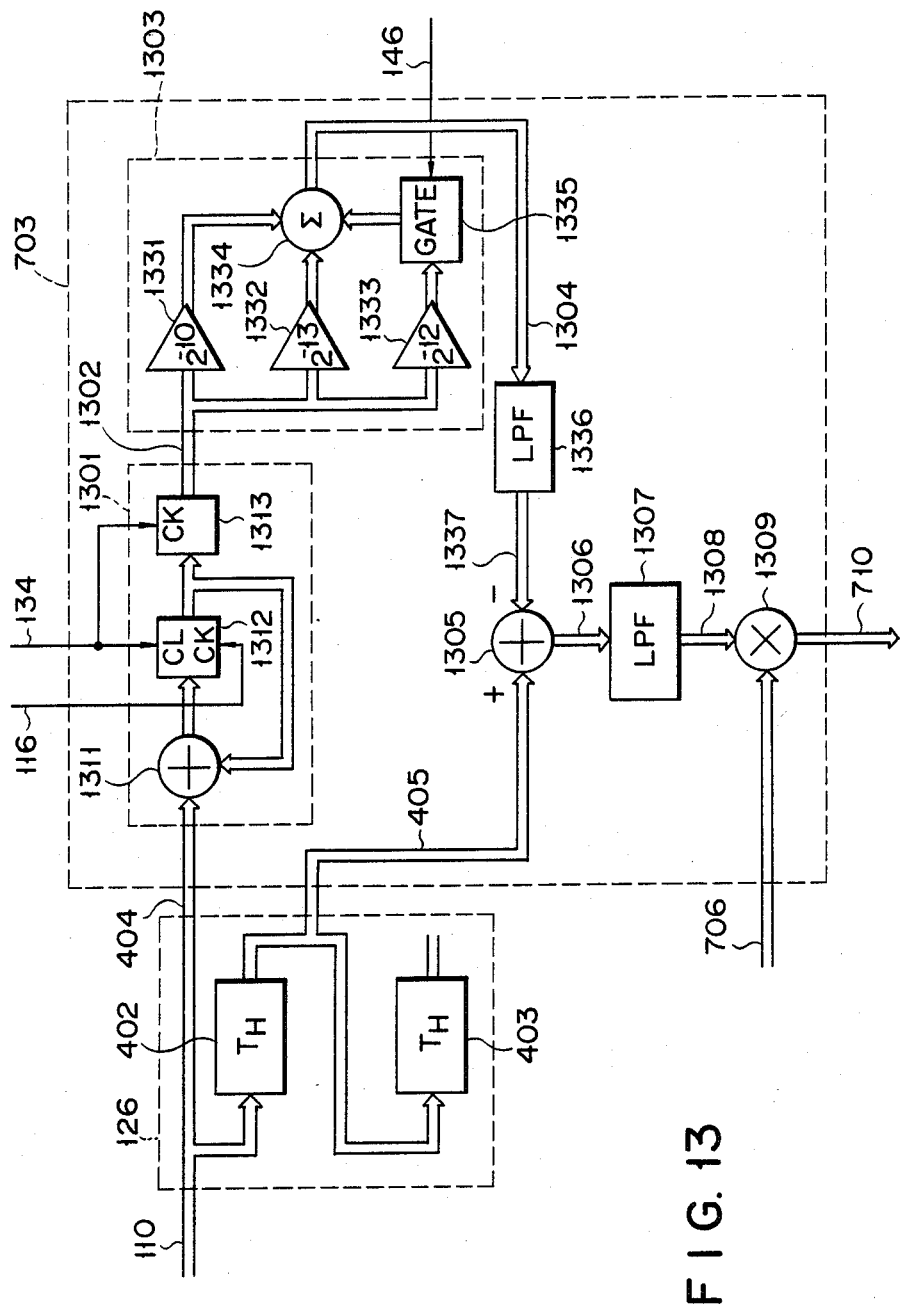
FIG. 13 shows the detailed configuration of the contrast circuit of FIG. 7.

FIG. 13 shows a detailed configuration of contrast circuit 703. Contrast circuit 703 comprises an integrator (or accumulator) 1301, an average value circuit 1303, a subtractor 1305, LPFs 1307 and 1336, and a multiplier 1309. Contrast circuit 703 prevents leakage of the DC component (brightness signal) of the video signal to a contrast signal 1308, using integrator 1301 and average value circuit 1303. For this reason, the brightness will not change even if contrast of pictures is adjusted.

The overall operation of contrast circuit 703 will now be described. A $0T_H$-delayed signal 404 from $2T_H$ delay circuit 126 is supplied to integrator 1301, so that data of a picture portion for one horizontal period is integrated or accumulated. An integrated result 1302 is supplied to average value circuit 1303 during the next horizontal period. Average value circuit 1303 divides integrated result 1302 by a predetermined value to obtain an average value 1304 of the picture portion. Average value 1304 is supplied via LPF 1336 to subtractor 1305. LPF 1336 has a time constant corresponding to several vertical periods, thereby averaging the value 1304 to provide an averaged output 1337. Averaged output 1337 corresponds to the average illuminance during one line period (1H). Subtractor 1305 also receives a $1T_H$-delayed signal 405 obtained from $2T_H$ delay circuit 126. Subtractor 1305 subtracts LPF output 1337 from $1T_H$-delayed signal 405, thereby obtaining an AC component 1306 of the picture portion. AC component 1306 has the horizontal DC component. For this reason, the transfer function from the $1T_H$-delayed signal 405 to the DC component 1306 provides "0" at f=0 (along the axis of vertical frequency) and "1" at any frequency other than f=0. Output 1337 corresponding to $0T_H$-delayed signal 404 is delayed by $1T_H$. Therefore, the $1T_H$-delayed output 1337 is subtracted by subtractor 1305 from $1T_H$-delayed signal 405 so as to match the phases of output 1337 and $1T_H$-delayed signal 405. Contrast corresponds to a low-frequency component of the video signal since it is a change in brightness over a considerably large area on the screen. The low-frequency component is extracted by LPF 1307, so that contrast signal 1308 is obtained. This contrast signal 1308 and constrast control signal 706 are multiplied by multiplier 1309 so that the amplitude of contrast signal 1308 is corrected. A corrected signal is then produced as contrast signal 710.

Figure 13A:
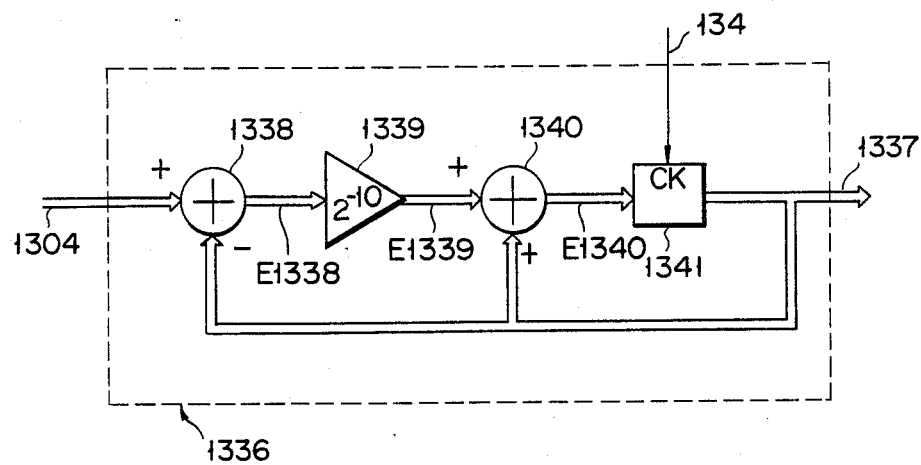
FIG. 13A shows the circuit configuration of LPF1336 shown in FIG. 13.

FIG. 13A shows details of LPF 1336 shown in FIG. 13. Average value 1304 is supplied to a subtractor 1338. Subtractor 1338 subtracts said averaged output 1337 from average value 1304, and provides a subtracted result E1338. Subtracted result E1338 is multiplied by $2^{-10}$ by a coefficient multiplier 1339. An output E1339 from coefficient multiplier 1339 is added to averaged output 1337 by an adder 1340. Adder 1340 supplies an added result E1340 to a latch 1341. Result E1340 is loaded to latch 1341 when latch 1341 is clocked by flyback pulse 134.

In LPF 1336, data corresponding to the difference between the present input (average value 1304) and the present output (averaged output 1337) is added to the present output 1337, thereby renewing the averaged output 1337. This operation corresponds to the operation of an RC integration circuit. The data of latch 1341 is renewed by every $1T_H$ period. When the gain A of coefficient multiplier 1339 is $2^{10}$, the time constant of LPF 1336 is $A^{-1}\cdot T_H = 2^{-10}\cdot T_H (\approx 4T_V \cdot T_V$ denotes a vertical period). By the constant of LPF 1336, rapid change in average value 1304 is suppressed and thus, stripe-like luminance noises on a displayed picture can be avoided.

The components of the contrast circuit shown in FIG. 13 will be described in detail hereinafter. Integrator 1301 comprises an adder 1311, and latches 1312 and 1313. Latch 1312 performs latching at a timing of sampling pulse ($\phi_S$) 116 and is cleared to zero during the flyback period in response to flyback pulse 134. Therefore, when an output from adder 1311 is supplied to latch 1312 and an output from latch 1312 is fed back to adder 1311, picture period integration (accumulation operation) with respect to $0T_H$-delayed signal 404 is performed. Since latch 1312 is operated in response to sampling pulse ($\phi_S$) 116, adder 1311 adds the signals for every sampling period $T_S$, and the number $N_A$ of additions for the entire integration period is given as follows:

$$N_A = (T_H - T_{FB})/T_S$$

where $T_{FB}$ is the flyback period.

On the other hand, latch 1313 latches the output signal (integration result) from latch 1312 which is cleared in response to flyback pulse 134. The integration result latched in latch 1313 in response to flyback pulse 134 is supplied as integration result 1302 to average value circuit 1303. Average value circuit 1303 divides integration result 1302 by $N_A$ (i.e., it is multiplied by $1/N_A$) and generates a divided signal. If $T_{FB} = 0.2 \cdot T_H$, and $T_H = 910 \cdot T_S$ (NTSC), or $T_H = 1135 \cdot T_S$ (PAL), $N_A$ is calculated as follows:

$$N_Z = \begin{cases} 728 \text{ (NTSC)} \\ 908 \text{ (PAL)} \end{cases}$$

In practice, in order to decrease the number of circuit elements, the value $1/N_A$ is approximated by one of the following equations in accordance with the operating mode:

NTSC: $1/728 \rightarrow \frac{1}{2}^{10} + \frac{1}{2}^{12} + \frac{1}{2}^{13} = 1/745\ldots$ \hfill (5)

PAL: $1/908 \rightarrow \frac{1}{2}^{10} + \frac{1}{2}^{13} = 1/910\ldots$ \hfill (6)

As described above, when only numbers comprising powers of 2 are added, coefficient multipliers 1331, 1333 and 1332 for $2^{-10}$, $2^{-12}$ and $2^{-13}$ are readily obtained in accordance with proper wiring. In practice, only an adder 1334 and a gate 1335 are required as hardware. Gate 1335 is controlled in accordance with NTSC/PAL switching signal 146. In the NTSC mode, an output from the $2^{-12}$ coefficient multiplier 1333 is supplied to adder 1334 through gate 1335 in order to perform operation in accordance with equation (5). In the PAL mode, gate 1335 serves to provide a null input to adder 1334 in order to perform operation in accordance with equation (6). It should be noted that approximation errors in the NTSC and PAL modes are 2.2% and 0.2%, respectively, when NTSC and PAL numbers $1/N_A$ are approximated in accordance with equations (5) and (6). These errors can be neglected in practice. LPF 1307 is the same as the LPF 807 (bandwidth of 1 MHz) shown in FIG. 8.

As described above, integrator 1301, average value circuit 1303 and LPF 1336 can be constructed using very simple hardware, thereby preventing leakage of the DC component into the contrast signal 1308.

(4) Brightness Control

Referring to FIG. 7, brightness control is performed by adder 711 and pedestal clamp circuit 713. Unlike the horizontal and vertical contour controls and contrast control, brightness control is performed by controlling a DC component having the pedestal level of the picture as a reference. Therefore, brightness control signal 707 is directly supplied to adder 711 and is added together with other signals 704–706 and 708–710 to $Y^O$ signal 131 from Y/C separator 128. Y signal 712 is produced by adder 711. However, in this condition, the pedestal level of Y signal 712 from adder 711 changes, and the DC component of the picture portion with respect to the pedestal level is the same as $Y^O$ signal 131. Therefore, in pedestal clamp circuit 713, Y signal 712 is clamped to have a predetermined pedestal level in accordance with flyback pulse 134. Pedestal clamp circuit 713 then generates Y signal 133. The average luminance of Y signal 133 changes by an amount corresponding to the level of brightness control signal 707, as compared with the average luminance of $Y^O$ signal 131. Thus, brightness control is performed.

(Color Control/Color Killer Circuit)

Figure 14:
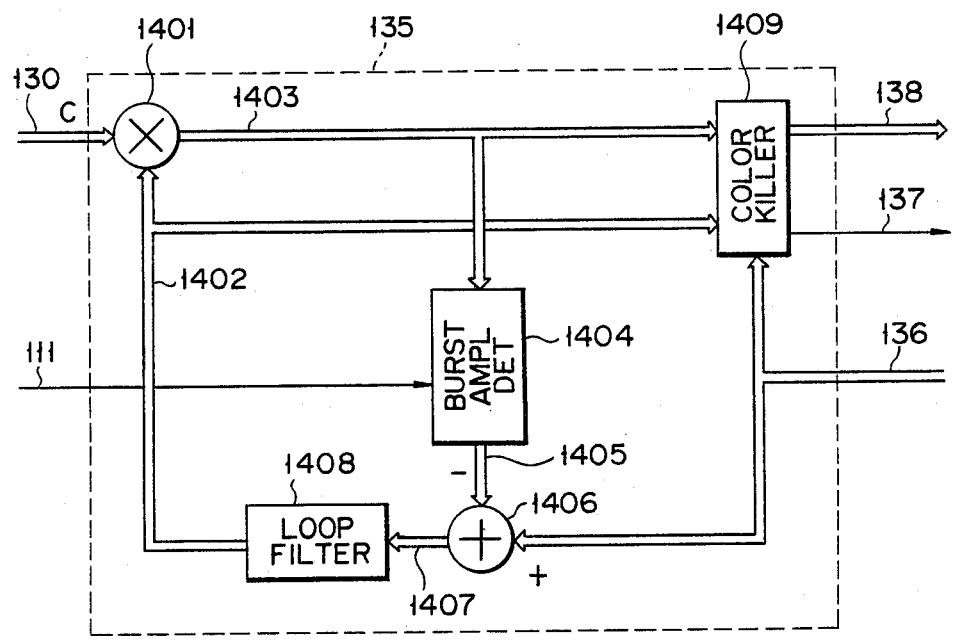
FIG. 14 shows the overall configuration of the color control/color killer circuit of FIG. 1.

FIG. 14 shows a detailed configuration of color control/color killer circuit 135. Color control/color killer circuit 135 serves to perform an automatic color control (ACC) for C signal 130, manual color control, and color killer operation, and to supply color killer signal 137 to Y/C separator 128 in order to produce video signal 422 (FIG. 4) as Y signal 131 in the color killer mode, as previously described.

Color control/color killer circuit 135 comprises a multiplier 1401, a color killer 1409, a burst amplitude detector 1404, a loop filter 1408, and a subtractor 1406. The overall configuration and operation of circuit 135 and then the components of circuit 135 will be described hereinafter.

C signal 130 is supplied to multiplier 1401 and is multiplied with an ACC signal 1402, so that the amplitude of C signal 130 is controlled. A C signal 1403 from multiplier 1401 is supplied to burst amplitude detector 1404 which then detects the amplitude of the color burst. Burst amplitude detector 1404 detects a value proportional to the amplitude of the color burst. A color burst amplitude signal 1405 is then supplied to subtractor 1406. Subtractor 1406 detects an error such that burst amplitude signal 1405 is subtracted from the ACC target value (i.e., the externally supplied manual control signal 136 for controlling the color saturation). Subtractor 1406 generates an ACC error signal 1407. ACC error signal 1407 is supplied to loop filter 1408 constituted by an LPF. Loop filter 1408 serves to determine an ACC time constant. The time constant is set to be several tens of $T_H$. An output signal from loop filter 1408 is supplied as ACC signal 1402 to multiplier 1401 and is multiplied with C signal 130 as described above. In this manner, the ACC loop is constituted by, in order, multiplier 1401, burst amplitude detector 1404, subtractor 1406, loop filter 1408 and multiplier 1401. The ACC loop controls the amplitude of C signal 130 to match the ACC target value in accordance with manual color control signal 136, and generates the updated C signal 138.

The color control circuit has the following two features. First, the ACC target value (signal 136) is externally supplied, and color control is performed in accordance with the ACC target value. Second, the amplitude of the NTSC color burst is detected in accordance with $|C_{\pm I}| \pm |C_{\pm Q}|$, and the amplitude of the PAL color burst is detected in accordance with $|C_{\pm U}| \pm |C_{\pm V}|$ (where $C_I$, $C_Q$, $C_U$ and $C_V$ indicate the levels of the burst signals sampled along the I-, Q-, U- and V-axes, respectively).

Regarding the first feature, it is advantageous that color control be performed by the variable ACC target value since a special multiplier need not be prepared for color control. Regarding the second feature, it is advantageous that the absolute values of the respective sampled points along the two axes shifted by 90° be added so as to readily perform hue control. More particularly, hue control is performed by changing the sampling phase in A/D 109 by changing phase target value 117 in PLL circuit 200 (FIG. 2).

However, a problem arises here. When the sampling phase changes, the sampled value of the burst component also changes. As a result, an erroneous burst amplitude value 119 may be produced. The value of ACC signal 1402 changes, and hence the value of C signal 1403 changes. In short, when the hue changes, the color saturation changes. In order to prevent this, the value of burst amplitude signal 1405 must be corrected in accordance with phase target value 117 (FIG. 1). However, largescale hardware is required for this purpose. Therefore, according to the present embodiment, as a simple method to reduce the change in color saturation to a negligible degree while hue control is performed, the amplitudes of the NTSC and PAL color burst signals are detected in accordance with $|C_{\pm I}| \pm |C_{\pm Q}|$ and $|C_{\pm U}| \pm C_{\pm V}|$, respectively. Under these conditions, even if the sampling phase is shifted by ±10° (hue variable range) from the I- and Q-axes (NTSC) or the U- and V-axes (PAL), the burst amplitude changes by only 5.2% (NTSC) or 1.5% (PAL). These errors can be neglected in practice.

The color killer operation will be described hereinafter. In general, the color killer mode is set only when the burst amplitude of C signal 130 is less than a predetermined value. According to this embodiment, utilizing the fact that the value of ACC signal 1402 is inversely proportional to that of C signal 130, when ACC signal 1402 has a value exceeding a predetermined value K, the color killer mode is set. However, the value of ACC signal 1402 changes in proportion to the amplitude of manual color control signal 136 even when C signal 130 keeps the same level. In order to stably set the color killer mode, the predetermined value K must be proportional to the amplitude of manual color control signal 136. For this reason, color killer 1409 receives ACC signal 1402 and manual color control signal 136. Manual color control signal 136 is a multiplied by a given constant, and a multiplied signal value is preset to be the predetermined value K. This predetermined value K is compared with ACC signal 1402. When the value of ACC signal 1402 is greater than the predetermined value K, the color killer mode is set. When the color killer mode is set, C signal 138 is set at zero, and the video signal 424 (FIG. 4) is produced as $Y^O$ signal 131 from Y/C separator 128. As a result, the bandwidth of $Y^O$ signal 131 is widened. The operation mode of the color killer as described above has an advantage in that a simple circuit may be used, as compared with the conventional system wherein the amplitude of the color burst of C signal 130 is detected, the color burst amplitude signal is supplied to LPF to determine the time constant, and the color killer mode is set when the value of the output signal from LPF is smaller than a predetermined value.

Figure 15:
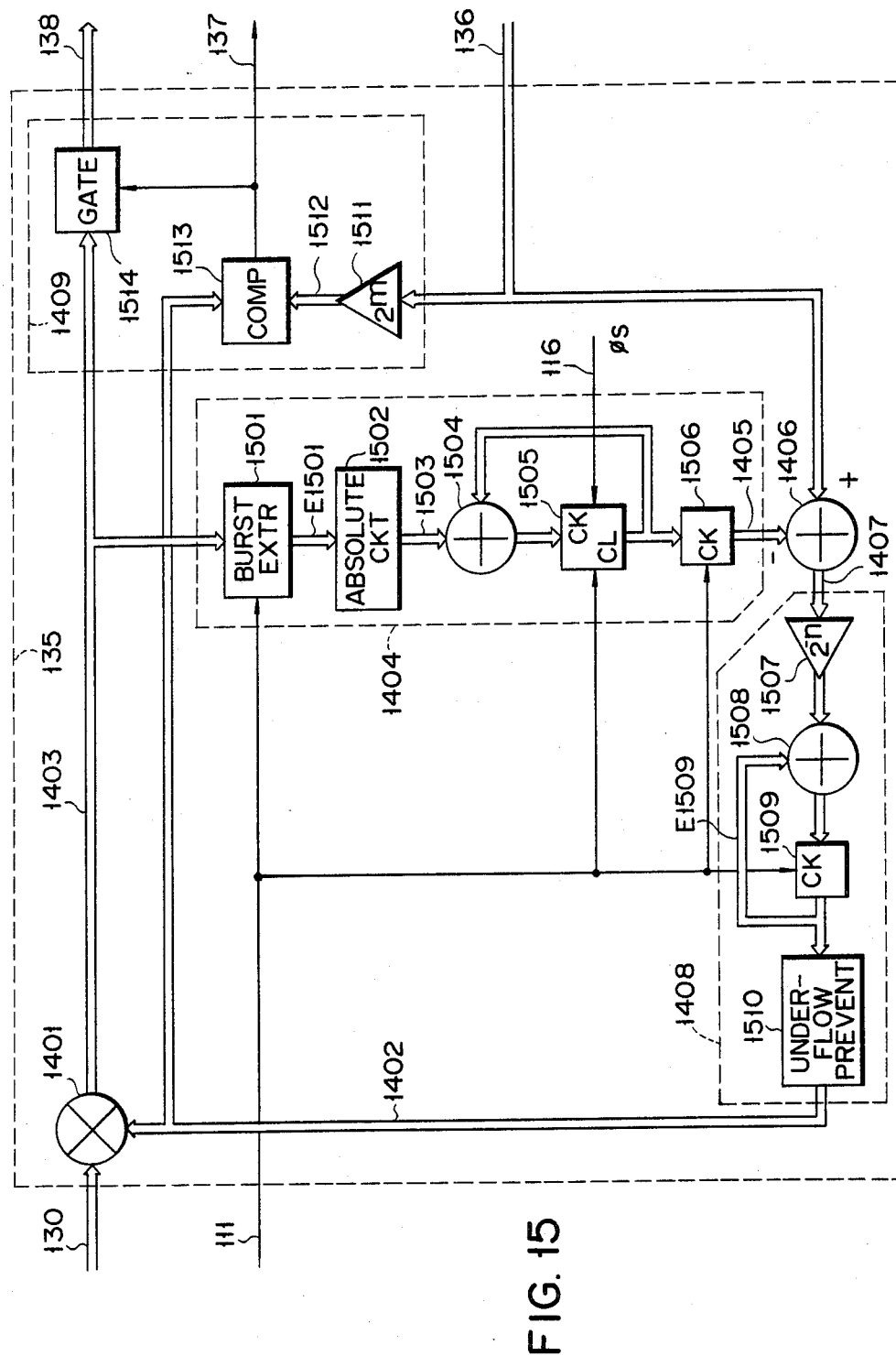
FIG. 15 shows the detailed configuration of the circuit shown in FIG. 14.

The components of color control/color killer circuit 135 shown in FIG. 14 will be described in detail with reference to FIG. 15. Referring to FIG. 15, burst amplitude detector 1404 comprises a burst extraction circuit 1501, an absolute value circuit 1502, an adder 1504, and latches 1505 and 1506.

Burst amplitude detector 1404 serves to integrate or accumulate the absolute values of the color burst pulses (for six periods) while burst extraction pulse 111 is set at high level, and to supply an integrated or accumulated result 1405 to subtractor 1406 during one horizontal period ($T_H$). C signal 1403 from multiplier 1401 is gated in burst extraction circuit 1501 in response to burst extraction pulse 111. Signals (24 samples) for the six periods of the color burst are extracted by extraction circuit 1501 and are supplied as signals E1501 to absolute value circuit 1502. Absolute value circuit 1502 detects the sign bit of the color burst signal. When the sign bit is set at logic level "1", data is inverted. However, when the sign bit is set at logic level "0", the data passes through absolute value circuit 1502. Absolute value circuit 1502 thus detects the absolute values of the color burst signal. Absolute value signals 1503 are accumulated by adder 1504 and stored in latch 1505 during the burst extraction pulse (111) period. Latch 1505 latches data in accordance with sampling pulse ($\phi_S$) 116 and is cleared during a time interval excluding the period of burst extraction pulse 111. The latched value immediately before latch 1505 is cleared is then loaded into latch 1506 by pulse 111. The latched signal outputted from latch 1506 is produced as burst amplitude signal 1405.

Loop filter 1408 serves to determine an ACC time constant. Loop filter 1408 comprises a $2^{-n}$ coefficient multiplier 1507, an adder 1508, a latch 1509 and an underflow prevention circuit 1510. Underflow prevention circuit 1510 prevents ACC signal 1402 from taking a negative value. The $2^{-n}$ coefficient multiplier 1507 has an arrangement for shifting the data by n bits toward the LSB side in accordance with proper wiring; special hardware can thus be eliminated. Latch 1509 performs latching in accordance with burst extraction pulse 111. Multiplier 1507 multiplies an inputted error signal 1407 by $2^{-n}$. A multiplied signal from multiplier 1507 is accumulated (integrated) at each $T_H$ by adder 1508 and latch 1509. An abrupt change (high-frequency component) in error signal 1407 can be absorbed by the above accumulation. In this circuit arrangement, the ACC time constant is proportional to $2^n \cdot T_H$. Therefore, when n is properly determined, the ACC time constant can be determined to have a proper value. An output signal from loop filter 1408 is supplied as ACC signal 1402 to multiplier 1401.

In color killer circuit 1409, the value of ACC signal 1402 is compared by a comparator 1513 with a value 1512 (color killer threshold K) obtained by multiplying the value of manual color control signal 136 by a constant ($2^m$). When the value of ACC signal 1402 is greater than the multiplied value 1512, color killer signal 137 is set at logic level "0". This signal 137 is supplied as a gate control signal to a gate 1514 to which C signal 1403 is inputted. Therefore, C signal 138 from gate 1514 is set at logic level "0", and C signal 422 from C signal gate 421 (FIG. 4) also becomes logic level "0". As a result, video signal 424 is produced as $Y^O$ signal 131 from subtractor 425.

(Chrominance Signal Demodulator)

FIG. 16 shows a detailed configuration of chrominance signal demodulator 139. Chrominance signal demodulator 139 comprises latches 1601, 1602, 1605 to 1607, and a gate circuit 1613 including gates 1608 to 1611 and an inverter 1612. In the NTSC mode, chrominance signal demodulator 139 serves to selectively latch the I-phase data in latch 1601 for demodulating an I signal 1603. The Q-phase data is selectively latched by latch 1602 to demodulate a Q signal 1604. In the PAL mode, in chrominance signal demodulator 139, U-phase data in C signal 138 is latched by latch 1601 to demodulate U signal 1603. On the other hand, the V signal is inverted for every horizontal line. Therefore, the latch phase of latch 1602 must be switched between +V and −V for every horizontal line. This switching operation is performed in accordance with PAL ident signal 205. The operation of demodulator 139 will be described hereinafter.

C signal 138 is supplied to latches 1601 and 1602. On the other hand, the reference phase pulse 206 from phase detector 118 (FIG. 1) is also supplied to chrominance signal demodulator 139. Reference phase pulse 206 has a phase along the I-axis in the NTSC mode and along the U-axis in the PAL mode. Reference phase pulse 206 is supplied as a load pulse to latch 1601, so that the I- or U-phase data of C signal 138 is latched and I or U signal 1603 is demodulated. Reference phase pulse 206 is sequentially shifted by a one-sampling phase (90°) by latches 1605 to 1607. As a result, latch 1605 generates the −Q- or V-phase pulse, latch 1606 generates the −I or −U-phase pulse, and latch 1607 generates the Q or −V-phase pulse. Gate circuit 1613 receives NTSC/PAL switching signal 146, PAL ident signal 205 and the output signals from latches 1605 and 1607, and produces a Q or V demodulation pulse 1614. This demodulation pulse 1614 is supplied as a load pulse to latch 1602. Q or V demodulation pulse 1614 is used as the Q-phase pulse in the NTSC mode, and is used as the +V- or −V-phase pulse which corresponds to the content of PAL ident signal 205. Latch 1602 generates Q signal or V signal 1604. It should be noted that gate circuit 1613 is based on the assumption that NTSC/PAL switching signal 146 is set at logic level "0" (NTSC) and at logic level "1" (PAL), and PAL ident signal 205 is set at logic level "1" along the +V-axis and logic level "0" along the −V axis.

Demodulated C signal 141 from chrominance signal demodulator 139 is supplied together with Y signal 133 to matrix circuit 142. Matrix circuit 142 performs a predetermined matrix operation, thereby obtaining RGB signal 143. The contents of operation of matrix circuit 142 is switched in accordance with the NTSC/PAL switching signal 140.

Figure 17:
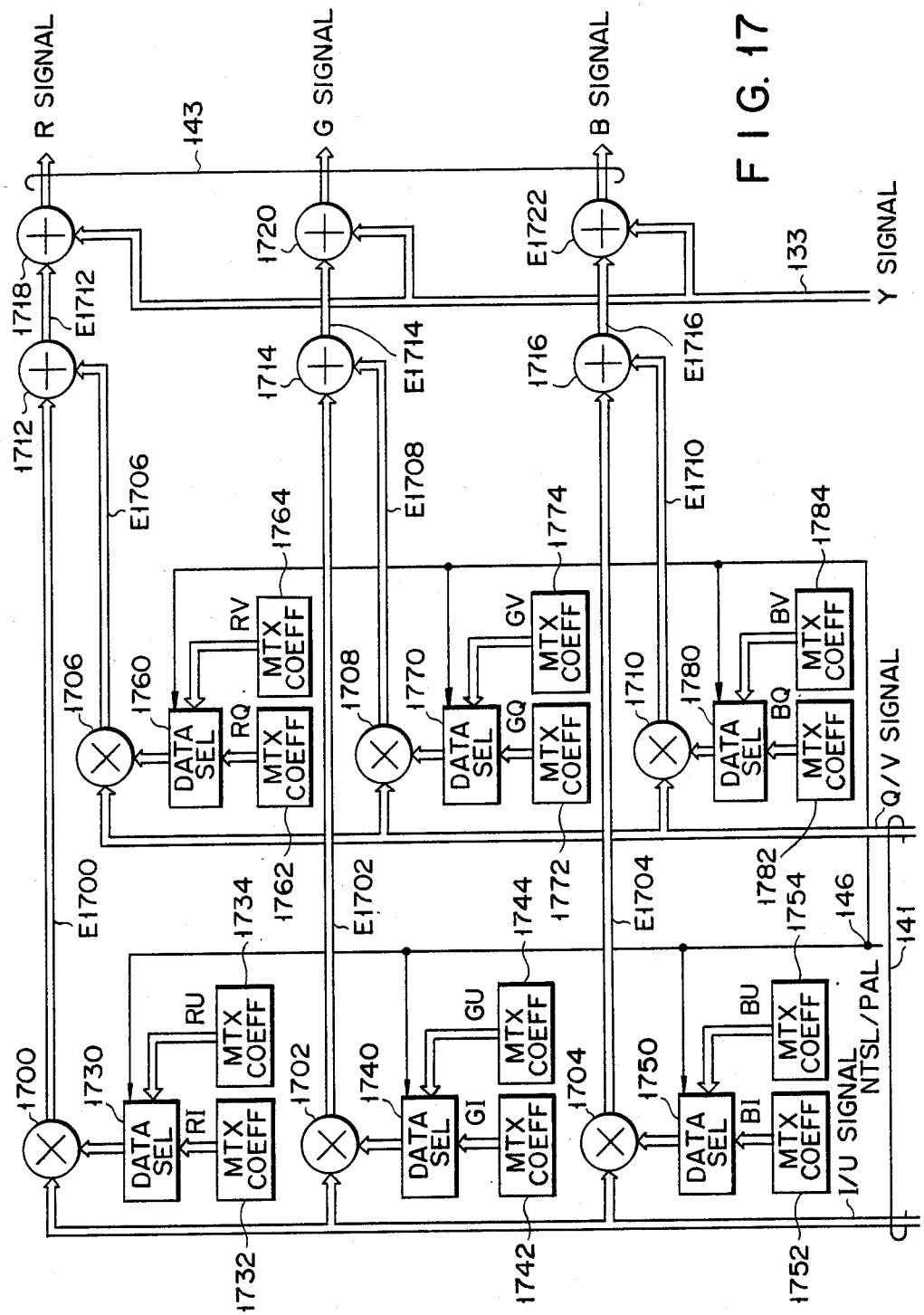
FIG. 17 shows a block configuration of an RGB matrix of FIG. 1.

FIG. 17 shows a block configuration of RGB matrix 142 in FIG. 1. Digital demodulated I signal (NTSC) or U signal (PAL) 141 from chroma demodulator 139 is supplied to multipliers 1700, 1702 and 1704. Digital demodulated Q signal (NTSC) or V signal (PAL) 141 from chroma demodulator 139 is supplied to multipliers 1706, 1708 and 1710. NTSC/PAL switching signal 146 is supplied as a selection instruction to data selectors 1730, 1740, 1750, 1760, 1770 and 1780. Selector 1730 selects one of a multiplicand RI (NTSC) from a matrix coefficient generator 1732 and a multiplicand RU (PAL) from a matrix coefficient generator 1734 according to NTSC/PAL switching signal 146. Similarly, selector 1740 selects one of multiplicands GI (NTSC) and GU (PAL) from generators 1742 and 1744. Selector 1750 selects one of multiplicands BI (NTSC) and BU (PAL) from generators 1752 and 1754. Selector 1760 selects one of multiplicands RQ (NTSC) and RV (PAL) from generators 1762 and 1764. Selector 1770 selects one of multiplicands GQ (NTSC) and GV (PAL) from generators 1772 and 1774. Selector 1780 selects one of multiplicands BQ (NTSC) and BV (PAL) from generators 1782 and 1784.

Selector 1730 supplies the selected multiplicands (RI or RU) to multiplier 1700 in accordance with the NTSC/PAL switching signal 146. Then, multiplier 1700 outputs a signal E1700 corresponding to RI×I signal or RU×U signal. Similarly, multiplier 1702 outputs a signal E1702 corresponding to GI×I signal or GU×U signal. Multiplier 1704 outputs a signal E1704 corresponding to BI×I signal or BU×U signal. Multiplier 1706 outputs a signal E1706 corresponding to RQ×Q signal or RV×V signal. Multiplier 1708 outputs a signal E1708 corresponding to GQ×Q signal or GV×V signal. Multiplier 1710 outputs a signal E1710 corresponding to BQ×Q signal or BV×V signal. Signal E1700 is added to signal E1706 by an adder 1712. Adder 1712 supplies an added result E1712 to an adder 1718. Adder 1718 adds Y signal 133 from Y process circuit 129 (FIG. 1) to result E1712, and provides an R signal. Similarly, signal E1702 is added to signal E1708 by an adder 1714 which supplies an added result E1714 to an adder 1720. Adder 1720 adds Y signal 133 to result E1714 and provides a G signal. Signal E1704 is added to signal E1710 by an adder 1716 which supplies an added result E1716 to an adder 1722. Adder 1722 adds Y signal 133 to result E1716 and provides a B signal. The output signals from adders 1718, 1720 and 1722 are supplied as the RGB signal 143 to D/A converter 144 (FIG. 1).

Digital clamp circuit 112 in FIG. 1 may be one as disclosed in Japanese Patent Application No. 57-132271. The correspondence between FIG. 1 of the present invention and FIG. 1 of the above JPA is as follows:

| FIG. 1 | FIG. 1 of JPA |
|---|---|
| 110 | 11 |
| 111 | 32' |
| 113 | 20 |
| 112 | 19 |

Digital sync separator/timing generator 122 in FIG. 1 may be one as disclosed in said JPA No. 57-132271. The correspondence between FIG. 1 of the present invention and FIG. 1 of the above JPA is as follows:

| FIG. 1 | FIG. 1 of JPA |
|---|---|
| 110 | 11 |
| 111 | 31, 28 |
| 123 | 29, 30 |
| 122 | 27 |

Count-down circuit 124 may be one as disclosed in FIG. 1 of said JPA No. 57-132271. The correspondence between FIG. 1 of the present invention and FIG. 1 of the above JPA is as follows:

| FIG. 1 | FIG. 1 of JPA |
|---|---|
| 123 | 29, 30 |
| 125 | 34, 37 |
| 124 | 32, 36 |

Figure 18:
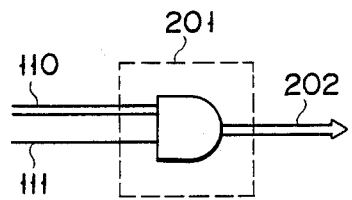
FIG. 18 shows an example of a burst extraction circuit of FIG. 2.

FIG. 18 shows an example of a burst extraction circuit 201 in FIG. 2. Thus, circuit 201 is an AND gate whose one input receives burst extraction pulse 111, while other inputs receive digital video signals 110.

Figure 19:
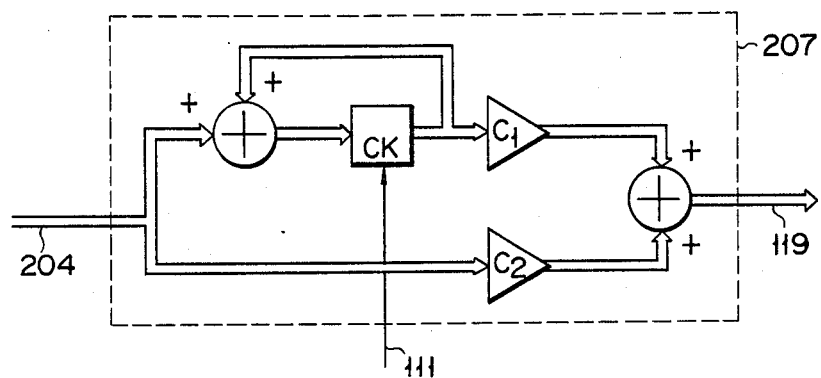
FIG. 19 shows an example of a LPF of FIG. 2.

FIG. 19 shows an example of a digital LPF 207 in FIG. 2. Thus, phase error signal 204 is supplied to an adder 207A. Adder 207A adds phase error signal 204 to a latched signal E207B, and provides an added result E207A to a latch 207B. Result E207A is loaded into latch 207B when burst extraction pulse 111 is generated. The latched result E207A becomes new latched signal E207B. Latched signal E207B and phase error signal 204 are inputted to coefficient multipliers 207C and 207D, respectively. Multiplier 207C multiplies inputted signal E207B by a given coefficient C1, and supplies a multiplied output E207C to an adder 207E. Multiplier 207D multiplies inputted signal 204 by a given coefficient C2, and supplies a multiplied output E207D to adder 207E. Adder 207E then adds the output E207D to the output E207C, and provides said phase error signal 119.

Figure 20:
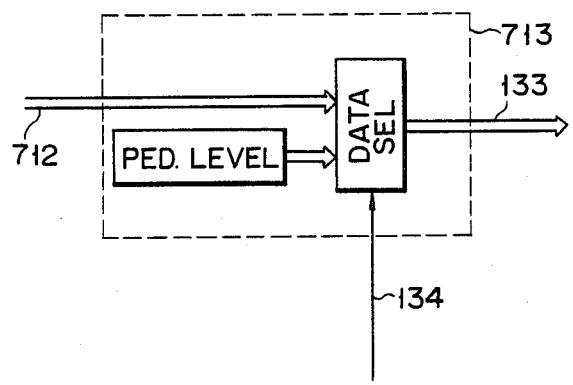
FIG. 20 shows an example of a pedestal clamp circuit of FIG. 7.

FIG. 20 shows an example of a pedestal champ circuit 713 in FIG. 7. Y signal 712 from adder 711 is supplied to a data selector 713A. Supplied also to data selector 713A is a pedestal level signal E713B obtained from a pedestal level generator 713B. Data selector 713A selects either one of signals 712 and E713B in accordance with flyback pulse 134, and provides the selected one as said updated Y signal 133.

Figure 21:
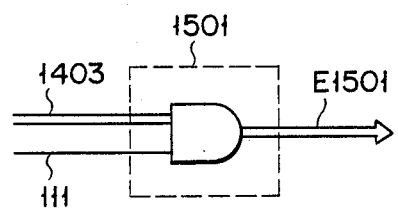
FIG. 21 shows an example of a burst extraction circuit of FIG. 15.

FIG. 21 shows an example of a burst extraction circuit 1501 in FIG. 15. The configuration of FIG. 21 is the same as that of FIG. 18 and hence, the explanation will be omitted.

Figure 22:
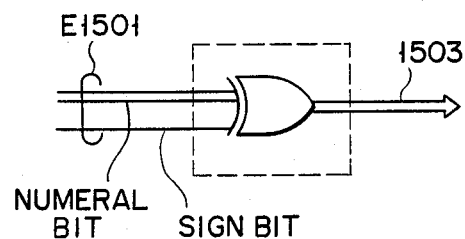
FIG. 22 shows an example of an absolute value circuit of FIG. 15.

FIG. 22 shows an example of an absolute value circuit 1502 in FIG. 15. Digital signals E1501 from burst extraction circuit 1501 are formed of numeral bits and a sign bit. These numeral and sign bits are inputted to an EXOR gate 1502A. The EXORed output from gate 1502A is used as said absolute value signals 1503.

Figure 23:
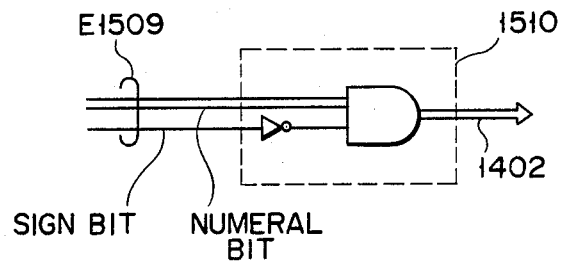
FIG. 23 shows an example of an underflow prevention circuit of FIG. 15.

FIG. 23 shows an example of an underflow prevention circuit 1510 in FIG. 15. Digital signals E1509 are formed of numeral bits and a sign bit. The numeral bits are inputted to an AND gate 1510A. The sign bit is inputted via an inverter 1510B to AND gate 1510A. The ANDed output from gate 1510A is used as said ACC signal 1402.

The present invention is exemplified by the particular embodiment. However, the basic circuit configuration and its system is not limited to the particular embodiment. Various changes and modifications may be made within the scope of the present invention. Further, the present invention may be effectively applied to a monitor reciever which does not receive a broadcast signal.

What is claimed is:

1. A digital television receiver comprising:
   digital converter means for converting an analog video signal to a digital video signal;
   signal separator means coupled to said digital converter means, for separating a digital chrominance signal and a digital luminance signal from said digital video signal;

color killer means coupled to said signal separator means and being responsive to burst components of said digital chrominance signal, for gating said digital chrominance signal to generate a gated color signal when said burst components are contained in said digital chrominance signal wherein said color killer means includes:

(a) multiplier means for digitally multiplying said digital chrominance signal by a amplitude control signal and providing a multiplied chrominance control signal;

(b) comparator means for comparing a color control signal and said amplitude control signal, and generating a color killer signal when a result of comparison of said comparator means indicates that a predetermined relation between said color control signal and said amplitude control signal is established;

(c) gate means coupled to said multiplier means and to said comparator means, for passing said multiplied chrominance signal to provide said gated color signal when said color killer signal is generated;

(d) burst detector means responsive to a color signal corresponding to said digital chrominance signal, for detecting said burst components from said color signal and generating a burst amplitude signal; and (e) control signal means coupled to said burst detector means and being responsive to said color control signal, for generating said amplitude control signal in accordance with a difference between said burst amplitude signal and said color control signal; and processor means coupled to said signal separator means and to said color killer means, for digitally composing RGB signals from said digital luminance signal and said gated color signal, and RGB signals being used as tricolor signals for a color picture tube.

2. A receiver according to claim 1, wherein said control signal means includes:

subtractor means coupled to said burst detector means, for detecting an error signal corresponding to a difference between said burst amplitude signal and said color control signal; and filter means coupled to said subtractor means, for digitally filtering said error signal and generating said amplitude control signal, said burst detector means, subtractor means, filter means and multiplier means constituting an automatic chroma control loop, and said filter means determining a signal delay rate or time constant of said automatic chroma control loop.

3. A receiver according to claim 2, wherein said error signal is a digital data, and wherein said filter means includes:

bit-shift means for shifting the digital data of said error signal toward the least significant bit side and generating a bit-shifted signal; and accumulator means coupled to said bit-shift means, for accumulating said bit-shifted signal with a given timing and generating said amplitude control signal.

4. A receiver according to claim 1, wherein said burst detector means includes:

burst extractor means for extracting said burst components from said color signal and generating an extracted signal corresponding to said burst components;

absolute value means coupled to said burst extractor means, for detecting the absolute value of said extracted signal and generating an absolute signal corresponding to said absolute value; and burst accumulator means coupled to said absolute value means, for accumulating said absolute signal with a given timing and generating said burst amplitude signal.

5. A digital television receiver comprising:

digital converter means for converting an analog video signal to a digital video signal;

signal separator means coupled to said digital converter means, for separating a digital chrominance signal and a digital luminance signal from said digital video signal wherein said signal separator means includes:

(a) delay means for delaying said digital video signal by a given amount to provide a delayed video signal;

(b) Y/C separator means coupled to said delay means for separating said digital chrominance signal and an unprocessed luminance signal from said delayed video signal; and (c) Y processor means coupled to said delay means and said Y/C separator means, for composing said digital luminance signal from said delayed video signal and said unprocessed luminance signal;

color killer means coupled to said signal separator means and being responsive to burst components of said digital chrominance signal, for gating said digital chrominance signal to generate a gated color signal when said burst components are contained in said digital chrominance signal; and processor means coupled to said signal separator means and to said color killer means, for digitally composing RGB signals from said digital luminance signal and said gated color signal, and RGB signals being used as tricolor signals for a color picture tube.

6. A receiver according to claim 5, wherein said Y processor means includes:

contrast means coupled to said delay means, for varying the contrast component of said delayed video signal and generating a varied signal corresponding to said contrast components; and combine means coupled to said contrast means and to said Y/C separator means, for combining said varied signal and said unprocessed luminance signal and generating as the result of combining said digital luminance signal.

7. A receiver according to claim 6, wherein said contrast means includes:

contrast accumulator means for accumulating said delayed video signal to generate an accumulated signal;

average means coupled to said contrast accumulator means, for averaging said accumulated signal for a given period of time to generate an averaged signal; and contrast filter means coupled to said average means, for smoothing the potential change of said averaged signal to generate a filtered signal;

means coupled to said delay means and to said contrast filter means and being responsive to a coefficient signal, for generating said varied signal from said delayed video signal and said filtered signal so that the difference between said delayed video signal and said filtered signal corresponds to said varied signal, the magnitude of said varied signal depending on said coefficient signal.

8. A receiver according to claim 6, wherein said Y processor means further includes:
V contour means coupled to said delay means, for generating a vertical contour signal from said delayed video signal and supplying said vertical contour signal to said combine means so that said digital luminance signal contains a signal component of said vertical coutour signal which modifies the vertical contour of pictures displayed at a CRT.

9. A receiver according to claim 8, wherein said V contour means includes:
V differential means for differentiating signal components of said delayed video signal for a prescribed period of time to generate a V differentiated signal;
V filter means coupled to said V differential means, for digitally low-pass filtering said V differentiated signal to generate a V filtered signal; and
V coefficient means coupled to said V filter means and being responsive to a V coefficient signal, for multiplying said V filtered signal by said V coefficient signal to generate said vertical coutour signal.

10. A receiver according to claim 6, wherein said Y processor means further includes:
H contour means coupled to said delay means, for generating a horizontal contour signal from said delayed video signal and supplying said horizontal contour signal to said combine means so that said digital luminance signal contains a signal component of said horizontal contour signal which modifies the horizontal contour of pictures displayed at a CRT.

11. A receiver according to claim 10, wherein said H contour means includes:
V average means for averaging signal components of said delayed video signal for a prescribed period of time to generate an averaged signal;
H filter means coupled to said V average means, for digitally low-pass filtering said averaged signal to generate an H filtered signal; and
H coefficient means coupled to said H filter means and being responsive to an H coefficient signal, for multiplying said H filtered signal by said H coefficient signal to generate said horizontal contour signal.

12. A digital television receiver comprising:
digital converter means for converting an analog video signal to a digital video signal;
signal separator means coupled to said digital converter means, for separating a digital chrominance signal and a digital luminance signal from said digital video signal wherein said signal separator means includes:
killer gate means coupled to said color killer means and being responsive to said color killer signal, for passing said digital chrominance signal as a gated signal when said color killer signal disappears, and preventing said digital chrominance signal to pass therethrough when said color killer signal appears; and
subtractor means coupled to said killer gate means, for subtracting said gated signal from a signal corresponding to said digital luminance signal;

color killer means coupled to said signal separator means and being responsive to burst components of said digital chrominance signal, for gating said digital chrominance signal to generate a gated color signal when said burst components are contained in said digital chrominance signal wherein said color killer means includes:
means responsive to said digital chrominance signal, for generating a color killer signal when said burst components are not contained in said digital chrominance signal; and
processor means coupled to said signal separator means and to said color killer means, for digitally composing RGB signals from said digital luminance signal and said gated color singal, and RGB signals being used as tricolor signals for a color picture tube.

13. A digital television receiver for digitizing an analog video signal and processing a digital video signal, comprising:
separator means for separating a chrominance signal and a luminance signal of the digital video signal wherein said separator means includes:
(a) a chrominance signal separator for separating the chrominance signal from the digital video signal;
(b) a subtractor for subtracting the chrominance signal from the digital video signal to obtain the luminance signal; and
(c) a gate inserted in an input side of said subtractor, which sets the chrominance signal supplied to said subtractor to zero when the color killer signal indicates the color killer mode; and
color killer means for setting a chrominance signal to be substantially zero when an amplitude of a color burst of the chrominance signal from said separator means has lower level than a predetermined level, and for supplying a color killer signal indicating to said separator means whether or not color killer operation is performed, said separator means being arranged to generate the digital video signal as the luminance signal in a color killer mode.

14. A digital television receiver comprising:
digital converter means for converting an analog video singal to a digital video signal;
signal separator means coupled to said digital converter means, for separating a digital chrominance signal and a digital luminance signal from said digital video signal wherein said signal separator means includes:
comb filter means for filtering said digital video signal with a first frequency characteristic $H_{comb}(f)$ and generating a first signal and a second signal;
band-pass filter means coupled to said comb filter means, for filtering said first signal with a second frequency characteristic $H_{hd\ BPF1}(f)$ and generating a third signal;
switch means coupled to said band-pass filter means and being responsive to an NTSC/PAL switch signal, for generating from said thrid signal a fourth signal with an NTSC filtering characteristic $H_{comb}(f) \cdot H_{BPF}(f)$ when said NTSC/PAL switch signal indicates an NTSC mode, and generating from said third signal a fifth signal with a PAL filtering characteristic $2H_{comb}(f) \cdot H_{BPF}(f)$ when said NTSC/PAL switch signal indicates a PAL mode; and
composition means coupled to said comb filter means and to said switch means, for composing said fourth signal and said second signal with an NTSC signal separation characteristic $H_y(f)_N$:

$$H_y(f)_N = 1 - H_{comb}(f) \cdot H_{BPF}(f)$$

and composing said fifth signal and said second signal with a PAL signal separation characteristic $H_y(f)_P$:

$$H_y(f)_P = 1 - 2 \cdot H_{comb}(f) \cdot H_{BPF}(f)$$

wherein said composition means generates said digital luminance signal according to said NTSC signal separation characteristic $H_y(f)_N$ when said NTSC/PAL switch signal indicates said NTSC mode, and generates said digital luminance signal according to said PAL signal separation characteristic $H_y(f)_N$ when said NTSC/PAL switch signal indicates said PAL mode, wherein said first frequency characteristic $H_{comb}(f)$ is defined as:

$$H_{comb}(nf_H) = 0$$

$$H_{comb}\{(n \pm \tfrac{1}{4})f_H\} = 0.5$$

$$H_{comb}\{(n + \tfrac{1}{2})f_H\} = 1$$

where n denotes a natural number and $f_H$ denotes a horizontal frequency of NTSC or PAL system, and wherein said second frequency characteristic $H_{BPF}(f)$ is defined as:

$$H_{BPF}(f_{sc}) = 1$$

where $f_{sc}$ deontes a chrominance subcarrier frequency of NTSC or PAL system;

color killer means coupled to said signal separator means and being responsive to burst components of said digital chrominance signal, for gating said digital chrominance signal to generate a gated color signal when said burst components are contained in said digital chrominance signal wherein said color killer means includes:

(a) multiplier means for digitally multiplying said digital chrominance signal by an amplitude control signal and providing a multiplied chrominance signal;

(b) comparator means for comparing a color control signal and said amplitude control sginal, and generating a color killer signal when a result of comparison of said comparator means indicates that a predetermined relation between said color control signal and said amplitude control signal is established;

(c) gate means coupled to said multiplier means and to said comparator means, for passing said multiplied chrominance signal to provide said gated color signal when said color killer signal is generated;

(d) burst detector means responsive to a color signal corresponding to said digital chrominance signal, for detecting said burst components from said color signal and generating a burst amplitude signal; and (e) control signal means coupled to said burst detector means and being responsive to said color control signal, for generating said amplitude control signal in accordance with a difference between said burst amplitude signal and said color control signal; and processor means coupled to said signal separator means and to said color killer means, for digitally composing RGB signals from said digital luminance signal and said gated color signal, and RGB signals being used as tricolor signals for a color picture tube.

15. A digital television receiver which is compatible with color and monochrome modes and processes a video signal in a digital form, comprising:

separator means for separating from the digital video signal, a digital primary luminance signal and a digital chrominance signal which contains burst components in the color mode, said digital primary luminance signal being obtained from said digital video signal without substantially narrowing its frequency bandwidth;

color killer means coupled to said separator means for providing, when the burst components are contained in said digital chrominance signal, both a first gated color signal corresponding to said digital chrominance signal, and a color killer signal representing the monochrome mode or color killer mode;

gate means, coupled to said separator means and color killer means, for gating said digital chrominance signal according to said color killer signal, so that a second gated color signal, corresponding to said digital chrominance signal, is generated from said gate means in the color mode, wherein said second gated color signal disappears in the monochrome or color killer mode; and composition means, coupled to said gate means and said separator means, for combining said second gated color signal with said digital primary luminance signal to generate a digital secondary signal, the frequency bandwidth of said digital secondary luminance signal in the color killer mode being substantially the same as that of said digital video signal, and said first gated color signal and said digital secondary luminance signal in the color mode being utilized to produce RGB color signals, wherein said separator means includes:

comb filter means for filtering said digital video signal with a first frequency characteristic $H_{comb}(f)$ to generate a digital comb-filtered signal;

band-pass filter means, coupled to said comb filter means, for filtering said digital comb-filtered signal with a second frequency characteristic $H_{BPF}(f)$ to generate a digital band-pass filtered signal; and switch means, coupled to said band-pass filter means and responsive to an NTSC/PAL switch signal, for producing said digital chrominance signal from said digital band-pass filtered signal with an NTSC filtering characteris $H_{comb}(f) \cdot H_{BPF}(f)$ when said NTSC/PAL switch signal indicates an NTSC mode, and producing said digital chrominance signal from said digital band-pass filtered signal with a PAL filtering characteristic $2H_{comb}(f) \cdot H_{BPF}(f)$ when said NTSC/PAL switch indicates a PAL mode.

16. A digital television receiver according to claim 15, wherein, when said NTSC/PAL switch signal indicates the NTSC mode, said composition means has an NTSC signal separation characteristic $H_y(f)_N = 1 - H_{comb}(f) \cdot H_{BPF}(f)$ for obtaining said digital secondary luminance signal.

17. A digital television receiver according to claim 16, wherein, when said NTSC/PAL switch signal indicates the PAL mode, said composition means has a PAL signal separation characteristic $H_y(f)_p = 1 - 2H_{comb}(f) \cdot H_{BPF}(f)$ for obtaining said digital secondary luminance signal.

18. A digital television receiver according to claim 15, wherein said first frequency characteristic $H_{comb}(f)$ is defined as:

$$H_{comb}(nf_H) = 0$$

$$H_{comb}\{(n \pm \tfrac{1}{4})f_H\} = 0.5$$

$$H_{comb}\{(n + \tfrac{1}{2})f_H\} = 1$$

wherein n denotes a natural number and $f_H$ denotes a horizontal frequency of NTSC or PAl system.

19. A digital television receiver according to claim 15, wherein said second frequency characteristic $H_{BPF}(f)$ is defined as:

$$H_{BPF}(f_{sc}) = 1$$

wherein $f_{sc}$ denotes a chrominance subcarrier frequency of NTSC or PAL system.

20. A digital television receiver according to claim 15, wherein, said color killer means indicates:
multiplier means for digitally mulitplying said digital chrominance signal by a given amplitude control signal, and for providing a digital multiplied chrominance signal;
comparator means, responsive to a given color control signal, for comparing said given amplitude control signal with said given color control signal, and for generating said color killer signal when the result of comparison of this comparator means indicates that a predetermined relation between said given amplitude control signal and said given color control signal is established;
killer gate means, coupled to said multiplier means and said comparator means, for gating said digital multiplied chrominance signal according to said color ciller signal, so that said first gated color signal, corresponding to said digital multiplied chrominance signal, is generated from said killer gate means in the color mode, wherein said first gated color signal disappears in the color killer mode;
burst detector means, coupled to said multiplier means, for detecting said burst components from said digital multiplied chrominance signal to generate burst amplitude signal; and
control signal means, coupled to said multiplier means and said burst detector means and responsive to said given color control signal, for generating said given amplitude control signal in accordance with a difference between said burst amplitude signal and said given color control signal.

21. A digital television receiver according to claim 20, wherein said control signal means includes:
difference detector means for detecting a difference between said given color control signal and said burst amplitude signal to generate an error signal formed with digital data;
filter means, coupled to said difference detector means, for digitally filtering said error signal to provide said given amplitude control signal.

22. A digital television receiver according to claim 21, wherein said burst detector means, said difference detector means, filter means and multiplier means constitute an automatic chroma control loop, a signal delay rate or time constant of which is determined by said filter means.

23. A digital television receiver according to claim 21, wherein said filter means includes:
bit-shift means for bit-shifting the digital data of said error signal toward the least significant bit side, and for generating a bit-shaped signal; and
accumulator means, coupled to said bit-shift means, for accumulating said bit-shifted signal to provide said given amplitude control signal.

24. A digital television receiver according to claim 20, wherein said burst detector means includes:
burst extractor means for extracting said burst components from said digital multiplied chrominance signal to generate an extracted signal representing said burst components;
absolute value means, coupled to said burst extractor means, for detecting the absolute value of said extracted signal to generate an absolute signal; and
burst accumulator means, coupled to said absolute value means, for accumlating said absolute signal to provide said burst amplitude signal.

25. A digital television receiver according to claim 15, wherein said composition means includes:
subtractor means, coupled to said separator means and said gate means, for subtracting said second gated color signal from said digital primary luminance signal to provide an unprocessed luminance signal; and
Y processor means, coupled to said subtractor means, for digitally processing said unprocessed luminance signal to provide said digtal secondary luminance signal.

26. A digital television receiver according to claim 25, wherein said separator means includes:
delay means for delaying said digital video signal by a given amount and for providing a delayed video signal containing contrast components, and wherein said Y processor means includes:
contrast means, coupled to said delay means, for varying the contrast components of said delayed video signal to generate a contrast-varied video signal; and
combine means, coupled to said contrast means and said subtractor means, for combining said contrast-varied video signal with said unprocessed luminance signal to generate said digital secondary luminance signal.

27. A digital television receiver according to claim 26, wherein said contrast means includes:
contrast accumulator means for accumulating said delayed video signal to generate an accumulated signal;
average means, coupled to said contrast accumulator means, for averaging said accumulated signal for a given period of time to generate an averages signal;
contrast filter means, coupled to said average means, for smoothing the potential change of said averaged signal to generate a filtered signal; and
means, coupled to said delay means and said contrast filter means and responsive to a coefficient signal, for producing said contrast-varied video signal from said delayed video signal and said filtered signal, such that the difference between said delayed video signal and said filtered signal corresponds to said contrast-varied video signal, the magnitude of said contrast-varied video signal depending on said coefficient signal.

28. A digital television receiver according to claim 26, wherein said Y processor means further includes:
V counter means, coupled to saiddelay means, for producing a vertical contour signal from said delayed video signal, and for supplying said vertical contour signal to said combine means so that said digital secondary luminance signal contains a signal component of said vertical contour signal which modifies the vertical contour of pictures displayed at a CRT.

29. A digital television receiver according to claim 28, wherein said V counter means includes:
V differential means for differentiating said delayed video signal for a prescribed period of time to generate a V differentiated signal;
V filter means, coupled to said V differential means, for digitally lowpass filtering said V differentiated signal to generate a V diltered signal; and
V coefficient means, coupled to said V filter means and responsive to a given V coefficient signal, for multiplying said V filtered signal by said given V coefficient signal to generate said vertical contour signal.

30. A digital television receiver according to claim 26, wherin said Y processor means further includes:
H counter means, coupled to said delay means, for producing a horizontal contour signal from said delayed video signal, and for supplying said horizontal contour signal to said combine means so that said digital secondary luminance signal contains a signal component of said horizontal contour signal which modifies the horizontal contour of pictures displayed at a CRT.

31. A digital television receiver according to claim 30, wherein said H counter means includes:
V average means for averaging said delayed video signal for a prescribed period of time to generate an averages signal;
H filter means, coupled to said V average means, for digitally lowpass filtering said averaged signal to generate an H filtered signal; and
H coefficient means, coupled to said H filter means and responsive to a given H coefficient signal, for multiplying said H filtered signal by said given H coeffiecient signal to generate said horzontal contour signal.

32. A digital television receiver according to claim 15, wherein said separator means includds:
phase adjust means, coupled to said composition means, for aligning the phase of said digital primary luminance signal with that of said second gated color signal.

* * * * *